US012472125B2

(12) United States Patent
Koike et al.

(10) Patent No.: US 12,472,125 B2
(45) Date of Patent: Nov. 18, 2025

(54) TABLET GUIDE PATH ADJUSTMENT DEVICE FOR TABLET CASSETTE

(71) Applicant: YUYAMA MFG. CO., LTD., Osaka (JP)

(72) Inventors: Naoki Koike, Osaka (JP); Mitsuhiro Mitani, Osaka (JP); Takanori Yorozu, Osaka (JP)

(73) Assignee: YUYAMA MFG. CO., LTD., Osaka (JP)

( * ) Notice: Subject to any disclaimer, the term of this patent is extended or adjusted under 35 U.S.C. 154(b) by 195 days.

(21) Appl. No.: 18/546,418

(22) PCT Filed: Feb. 16, 2022

(86) PCT No.: PCT/JP2022/006154
§ 371 (c)(1),
(2) Date: Aug. 14, 2023

(87) PCT Pub. No.: WO2022/181417
PCT Pub. Date: Sep. 1, 2022

(65) Prior Publication Data

US 2024/0122810 A1 Apr. 18, 2024

(30) Foreign Application Priority Data

Feb. 23, 2021 (JP) ................................. 2021-026891

(51) Int. Cl.
*A61J 7/00* (2006.01)

(52) U.S. Cl.
CPC .......... *A61J 7/0084* (2013.01); *A61J 2200/70* (2013.01)

(58) Field of Classification Search
CPC ..................................................... A61J 7/0084
See application file for complete search history.

(56) References Cited

U.S. PATENT DOCUMENTS

2006/0213917 A1 9/2006 Handfield et al.
2007/0164044 A1* 7/2007 Kim .................... G07F 17/0092 221/10

(Continued)

FOREIGN PATENT DOCUMENTS

CN 108366909 A 8/2018
EP 2572995 3/2013

(Continued)

OTHER PUBLICATIONS

European Patent Office, Extended European Search Report dated Jul. 8, 2024 in European Patent Application No. 22759456.1, 14 pages.

(Continued)

*Primary Examiner* — Gene O Crawford
*Assistant Examiner* — Ayodeji T Ojofeitimi
(74) *Attorney, Agent, or Firm* — MASUVALLEY & PARTNERS; Peter Martinez

(57) ABSTRACT

A tablet cassette (2) includes a tablet container (5) storing a tablet and a rotor (8) rotatably accommodated in the tablet container. The rotor (8) has a tablet guide path (**8*b*) for guiding the tablet of the tablet container (5) to a tablet discharge hole (9) of the tablet container (5) and an adjusting part (33, 64) capable of adjusting dimensions of the tablet guide path (8*b*). A tablet guide path adjusting device (100) includes: an adjusting member (102) that engages the adjusting part (33, 64); an operation amount detection part (131) that detects an operation amount of the adjusting member (102); and a notification part (20) that notifies a user of adjustment support information necessary for the user to adjust the adjusting part (33, 64) with the adjusting member (102) based on the operation amount detected by the operation amount detection part (131**).

15 Claims, 30 Drawing Sheets

(56) References Cited

U.S. PATENT DOCUMENTS

| | | | | |
|---|---|---|---|---|
| 2010/0078445 | A1 | 4/2010 | Nam | |
| 2013/0062363 | A1* | 3/2013 | Yuyama | B65B 35/08 221/82 |
| 2013/0256097 | A1 | 10/2013 | Koike et al. | |
| 2014/0014678 | A1 | 1/2014 | Yuyama et al. | |
| 2014/0183208 | A1* | 7/2014 | Bae | B65D 83/04 221/91 |
| 2016/0136052 | A1 | 5/2016 | Koike et al. | |
| 2018/0161247 | A1 | 6/2018 | Koike et al. | |
| 2023/0157929 | A1* | 5/2023 | Omura | G07F 11/24 221/277 |

FOREIGN PATENT DOCUMENTS

| | | | |
|---|---|---|---|
| EP | 2664316 | A1 | 11/2013 |
| EP | 2756834 | | 7/2014 |
| EP | 3323404 | | 5/2018 |
| EP | 3669852 | | 6/2020 |
| JP | 2004-137051 | A | 5/2004 |
| WO | 2012/077591 | A1 | 6/2012 |
| WO | 2012/096328 | A1 | 7/2012 |
| WO | 2017/164196 | A1 | 9/2017 |
| WO | WO 2019/035379 | A1 | 2/2019 |

OTHER PUBLICATIONS

WIPO, Japanese International Search Authority, International Search Report (with English translation) mailed on Mar. 29, 2022 in International Patent Application No. PCT/JP2022/006154, 6 pages.

WIPO, Japanese International Search Authority, International Written Opinion mailed on Mar. 29, 2022 in International Patent Application No. PCT/JP2022/006154, 4 pages.

Japan Patent Office, Office Action dated Feb. 4, 2025 with English translation in Japanese Patent Application No. 2023-502317, 10 pages.

Taiwan Intellectual Property Office, Office Action dated Jan. 23, 2025 with English translation in Taiwanese Patent Application No. 111106479, 31 pages.

* cited by examiner (a)

(b)

(a)

(b)

TABLET GUIDE PATH ADJUSTMENT DEVICE FOR TABLET CASSETTE

TECHNICAL FIELD

The present invention relates to a tablet guide path adjusting device for a tablet cassette that stores a large number of tablets and discharges the tablets according to a prescription. Specifically, the present invention relates to the tablet guide path adjusting device for the tablet cassette that can easily adjusts dimensions such as a depth, a height and a width of a groove of a tablet guide path of a rotor and an entry position of a partition member entering the tablet guide path in accordance with a shape or a size of the tablet accommodated in the tablet cassette.

BACKGROUND ART

Tablet storing and dispensing devices installed in dispensing pharmacies and hospitals can automatically provide prescribed tablets to many patients quickly, reliably and safely. Tablets may have many shapes and sizes such as circular, elliptical, spherical, capsule shaped, sugar-coated shaped and the like, but it is desirable for the tablet storing and dispensing device to dispense as many types of tablets as possible.

The tablet storing and dispensing device includes a large number of tablet cassettes capable of storing and dispensing different types of tablets. Each tablet cassette includes a cassette body storing the tablet and a rotor rotatably arranged at a bottom of a cassette body. As the rotor rotates, the tablets in the cassette body are sequentially guided to a plurality of tablet guide paths formed in the rotor. when each of the tablet guide paths coincides with a tablet discharge hole in the cassette body, the tablet at the bottom of the tablet guide path and the tablet above it are separated by a partition member, and only the tablet at the bottom is discharged from the tablet discharge hole.

In Patent Document 1, the applicant of the present application has proposed a tablet cassette in which a depth, a width and a partition position of a tablet guide path of a rotor can be changed according to the type of tablet. The tablet cassette of Patent Document 1 includes: a rotor elevating mechanism for elevating a rotor having an inclined outer surface forming a bottom surface of a tablet guide path; a width adjusting mechanism for relatively moving first and second movable members having sidewalls forming surfaces of a width direction of the tablet guide path in a circumferential direction of the rotor; and a tablet support table elevating mechanism that elevates the tablet support table for supporting the lowermost tablet in the tablet guide path. Since the tablet cassette of Patent Document 1 can adjust the depth, width and partition position of the tablet guide path, the tablets having various shapes and sizes can be handled.

RELATED ART DOCUMENT

Patent Document

Patent Document 1: WO2017/164196

SUMMARY OF THE INVENTION

Problems to be Solved by the Invention

Although dimensions of the tablet guide path of conventional tablet cassettes can be adjusted by each adjusting mechanism, determining the dimensions according to the various shapes and sizes of tablets is complicated and requires skill.

Therefore, an object of the present invention is to provide a tablet guide path adjusting device for a tablet cassette that can easily adjust dimensions of the tablet guide path according to a shape or a size of a tablet.

Means for Solving the Problems

As a means for solving the problems, the present invention provides a tablet guide path adjusting device for a tablet cassette including a tablet container storing a tablet and a rotor rotatably accommodated in the tablet container, the rotor having a tablet guide path for guiding the tablet of the tablet container to a tablet discharge hole of the tablet container and an adjusting part capable of adjusting dimensions of the tablet guide path, the tablet guide path adjusting device including: an adjusting member that engages the adjusting part; an operation amount detection part that detects an operation amount of the adjusting member; and a notification part that notifies a user of adjustment support information necessary for the user to adjust the adjusting part with the adjusting member based on the operation amount detected by the operation amount detection part.

It is preferable that the tablet guide path adjusting device includes a tablet master storage part that stores the dimensions of the tablet guide path suitable for a shape or a size of the tablet or numerical values related to the dimensions and the notification part reads a target value of the dimensions of the tablet guide path corresponding to the tablet stored in the tablet container from the tablet master storage part and notify the target value and a current value of the adjusting part based on the operation amount of the operation amount detection part.

It is preferable that the adjusting member is engageable with and disengageable from the rotor.

Further, it is preferable that the operation amount detection part is provided in a device body provided separately from the adjusting member.

Further, it is preferable that the adjusting part includes a plurality of adjusting parts and the adjusting member can be engaged and disengaged for each of the plurality of the adjusting parts of the rotor.

Furthermore, it is preferable that the operation amount detection part includes a plurality of the operation amount detection parts provided corresponding to the plurality of the adjusting parts and the adjusting member can be engaged with and disengaged from the plurality of the operation amount detection parts.

It is preferable that the tablet guide path adjusting device includes a base part having a rotor table on which the rotor is mounted and the base part is provided with a zero point detection sensor for detecting a zero point of the adjusting part.

It is preferable that a guide part for guiding a central shaft of the adjusting member is provided above the base part, a guide hole into which the central shaft of the adjusting member is inserted is formed in the guide part and the guide hole is formed on the same axis as the adjusting part of the rotor mounted on the rotor table.

It is preferable that the operation amount detection part is provided in the guide part and detects a rotation amount of the central shaft of the adjusting member inserted through the guide hole.

It is preferable that the guide part is provided with a rotating member capable of rotating integrally with the central shaft of the adjusting member and the operation amount detection part detects the rotation amount of the central shaft of the adjusting member inserted through the guide hole via the rotating member.

It is preferable that the rotating member has an engaging hole that communicates with the guide hole and engages with the central shaft of the adjusting member.

It is preferable that the rotating member is formed with a rattling prevention part that prevents rattling between the engaging hole and the central shaft.

It is preferable that the rotating member and the operation amount detection part are connected via a gear and the operation amount detection part has a backlash prevention part that prevents backlash of the gear by biasing toward the rotating member.

It is preferable that the adjusting member has a central shaft and a grip part and a torque limiter is provided between the central shaft and the grip part of the adjusting member to prevent transmission of a rotational force to the central shaft when the rotational force greater than a predetermined amount acts on the grip part.

It is preferable that the grip part of the adjusting member is provided movably in the axial direction with respect to the central shaft and is movable between an engaging position where the grip part engages with the central shaft so as to be able to rotate integrally therewith and a non-engaging position where the grip part idles with respect to the central shaft.

Effects of the Invention

According to the present invention, dimensions such as a depth, a thickness and a height of the tablet guide path can be easily adjusted according to the shape or the size of the tablet.

MODE FOR CARRYING OUT THE INVENTION

Embodiments of the present invention will be described below with reference to the accompanying drawings.

Figure 1:
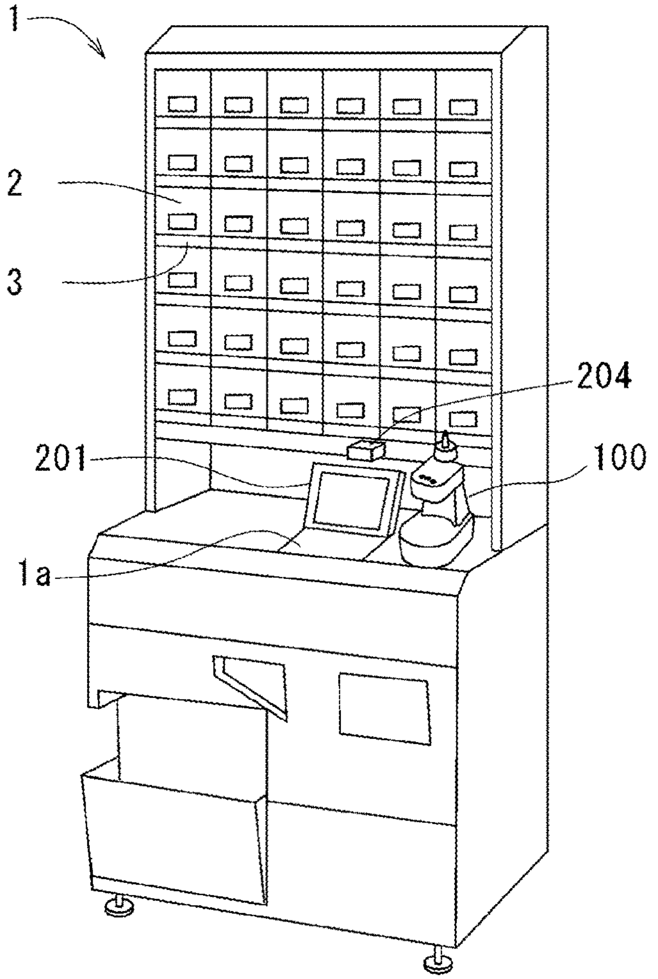
FIG. 1 is a perspective view of a tablet storing and dispensing device equipped with a tablet guide path adjusting device.

FIG. 1 shows a tablet storing and dispensing device 1 capable of dispensing a type and a number of tablets according to a prescription. A large number of tablet cassettes 2 are detachably provided on respective bases 3 in the tablet storing and dispensing device 1. A tablet guide path adjusting device 100 according to the present invention is installed on a table 4 provided beside the tablet storing and dispensing device 1. First, after explaining a structure of the tablet cassette 2, the tablet guide path adjusting device 100 will be explained. The term "tablet" as used in the present invention includes not only tablets in a narrow sense, but also medicines that can be dispensed from the tablet cassette 2, such as capsules and sugar-coated tablets.

Figure 2:
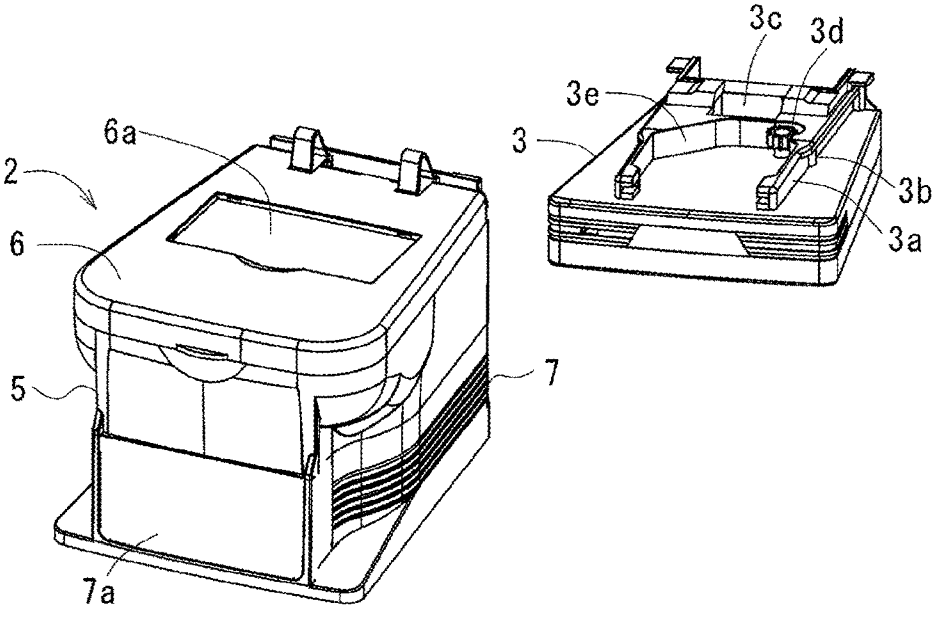
FIG. 2 is a perspective view of a tablet cassette and a base.
Figure 3:
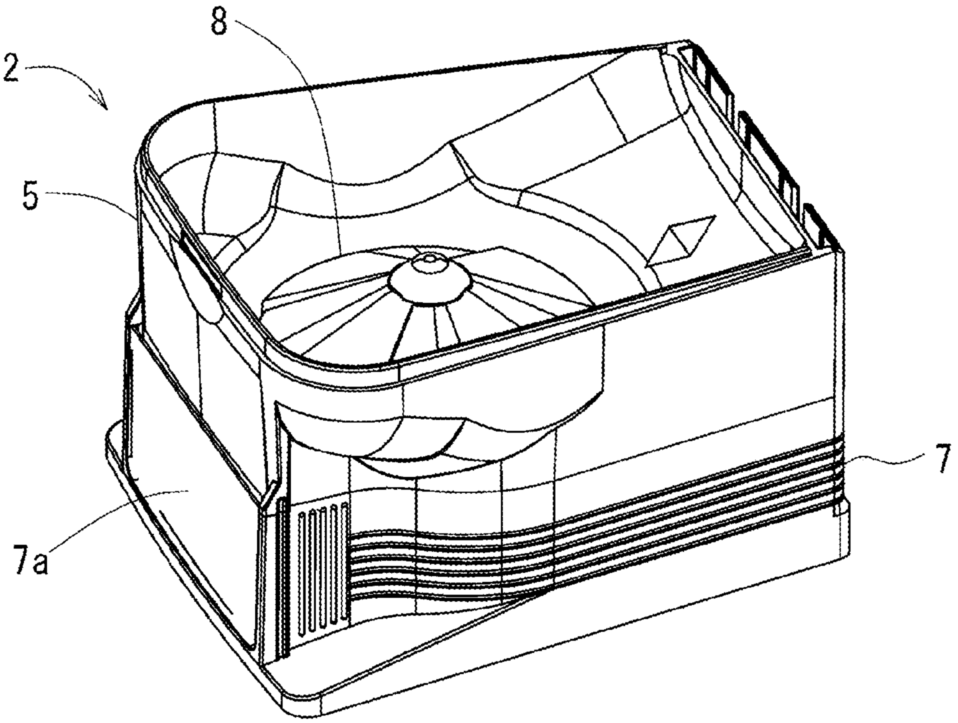
FIG. 3 is a perspective view of a state where a lid of the tablet cassette is removed.

FIG. 2 shows the tablet cassette 2 and its base 3 to be mounted on the tablet storing and dispensing device 1. The tablet cassette 2 comprises a cassette body 5 which is a tablet container of the present invention, a lid 6 that opens and closes and detachably covers an upper opening of the cassette body 5, a skirt part 7 provided at a bottom of the cassette body 5, and a rotor 8 accommodated in the cassette body 5 as shown in FIG. 3.

Figure 4:
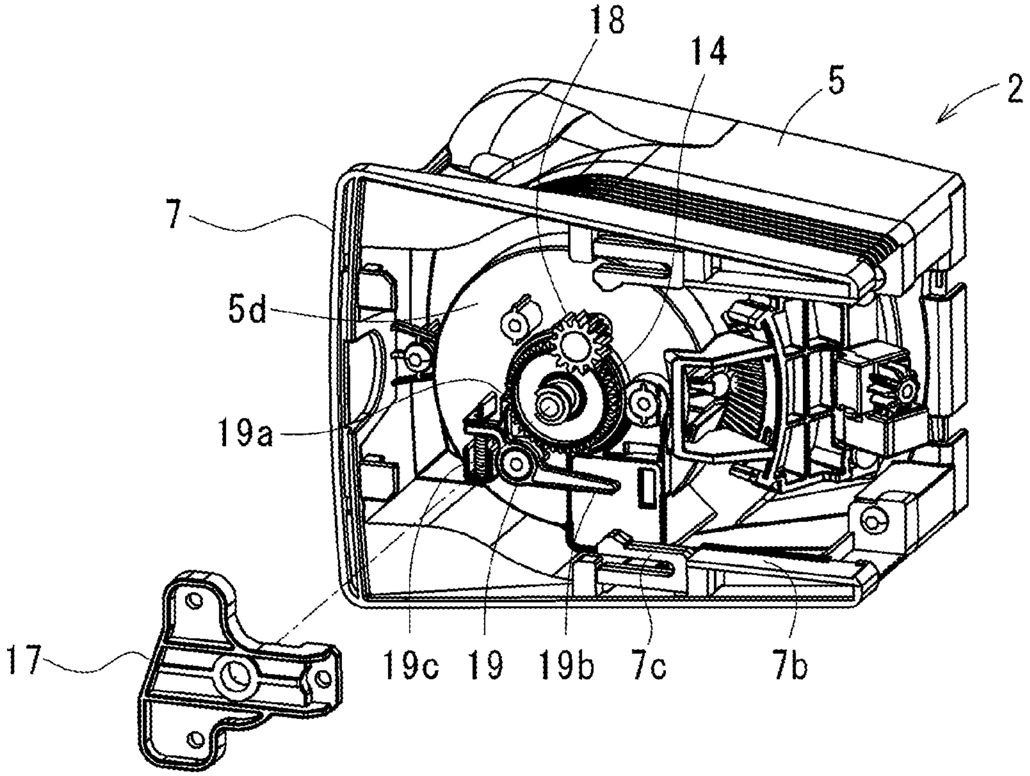
FIG. 4 is a perspective view seen from a bottom of the tablet cassette.

An upper surface of the lid 6 and a front surface of the skirt part 7 are formed with pockets 6*a* and 7*a* for accommodating labels or cards capable of identifying the tablets stored in the tablet cassette 2. As shown in FIG. 4, an inner surface of the skirt part 7 is provided with a sliding portion 7*b* that slides on a mounting guide 3*a* of the base 3 shown in FIG. 2 and an elastic engaging piece 7*c* that engages with an engaging portion 3*b* of the mounting guide 3*a*.

<Structure of Cassette Body>

Figure 5:
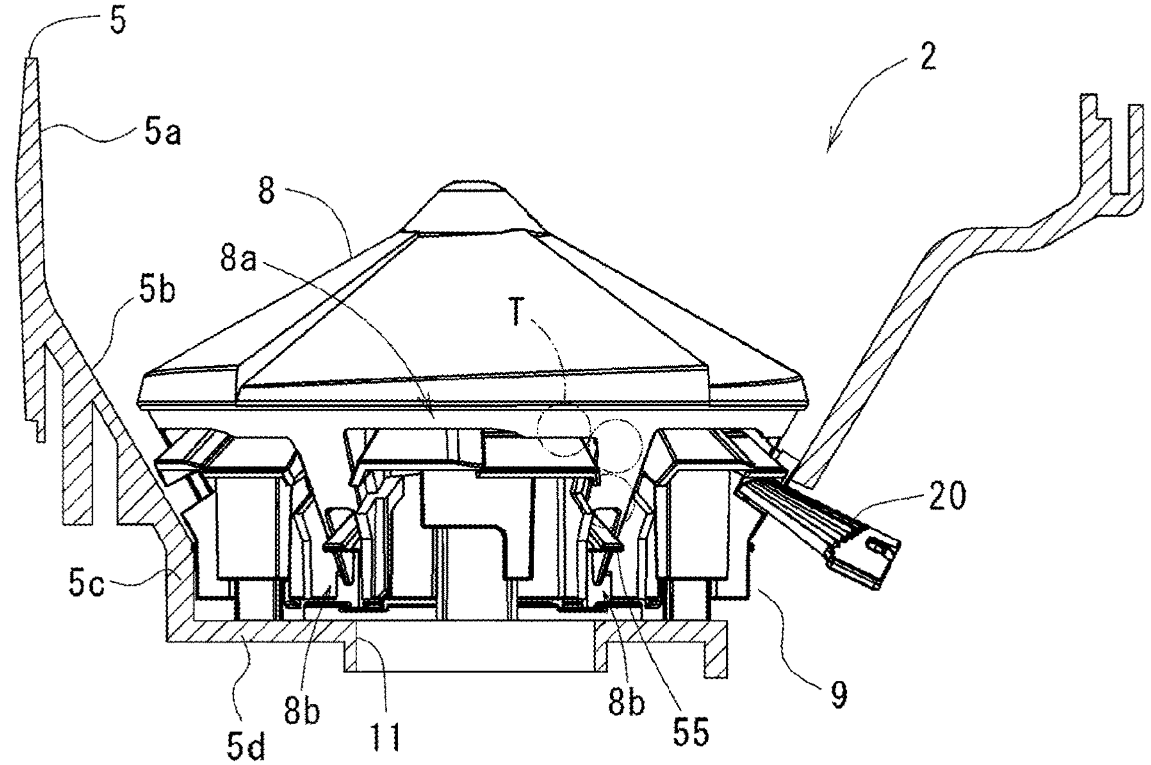
FIG. 5 is a cross-sectional view of the cassette body.
Figure 6:
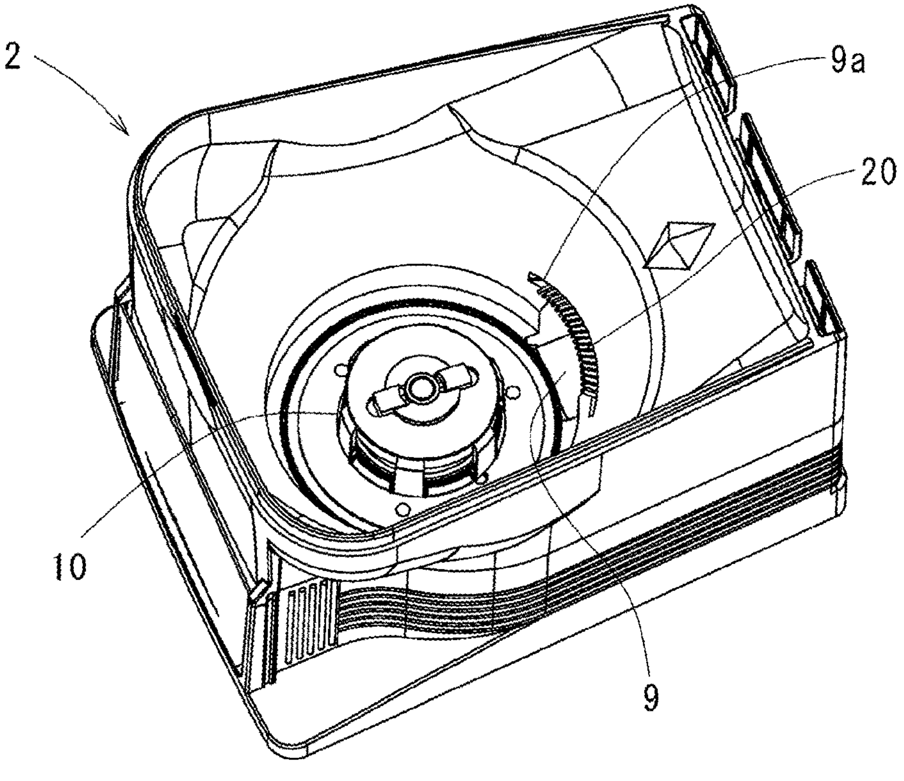
FIG. 6 is a perspective view of the tablet cassette with a rotor removed.

As shown in FIG. 5, the cassette body 5 is composed of a rectangular upper portion 5*a* opening upward, an inverted conical inclined portion 5*b*, a cylindrical tubular portion 5*c*, and a bottom portion 5*d*. A rotor 8 is accommodated in an internal space from the bottom portion 5*d* to the inclined portion 5*b*, and a large number of tablets T can be stored above the rotor 8. A tablet discharge hole 9 is formed from a lower portion of the inclined portion 5*b* to the bottom portion 5*d*. The tablet discharge hole 9 communicates with a tablet discharge path 3*c* formed in the base 3 shown in FIG. 2. A partition member 20 and a partition adjusting mechanism M1 for adjusting a position of the partition member 20, which will be described later, are attached to an outside of the cassette body 5. A tip of the partition member 20 is inserted inside from an outside of the inclined portion 5*b* through a slit 9*a* shown in FIG. 6 formed above the tablet discharge hole 9. A rotor shaft hole 11 is formed in a center of the bottom portion 5*d* to accommodate the rotor driving part 10 shown in FIG. 6.

<Rotor Driving Part>

Figure 7:
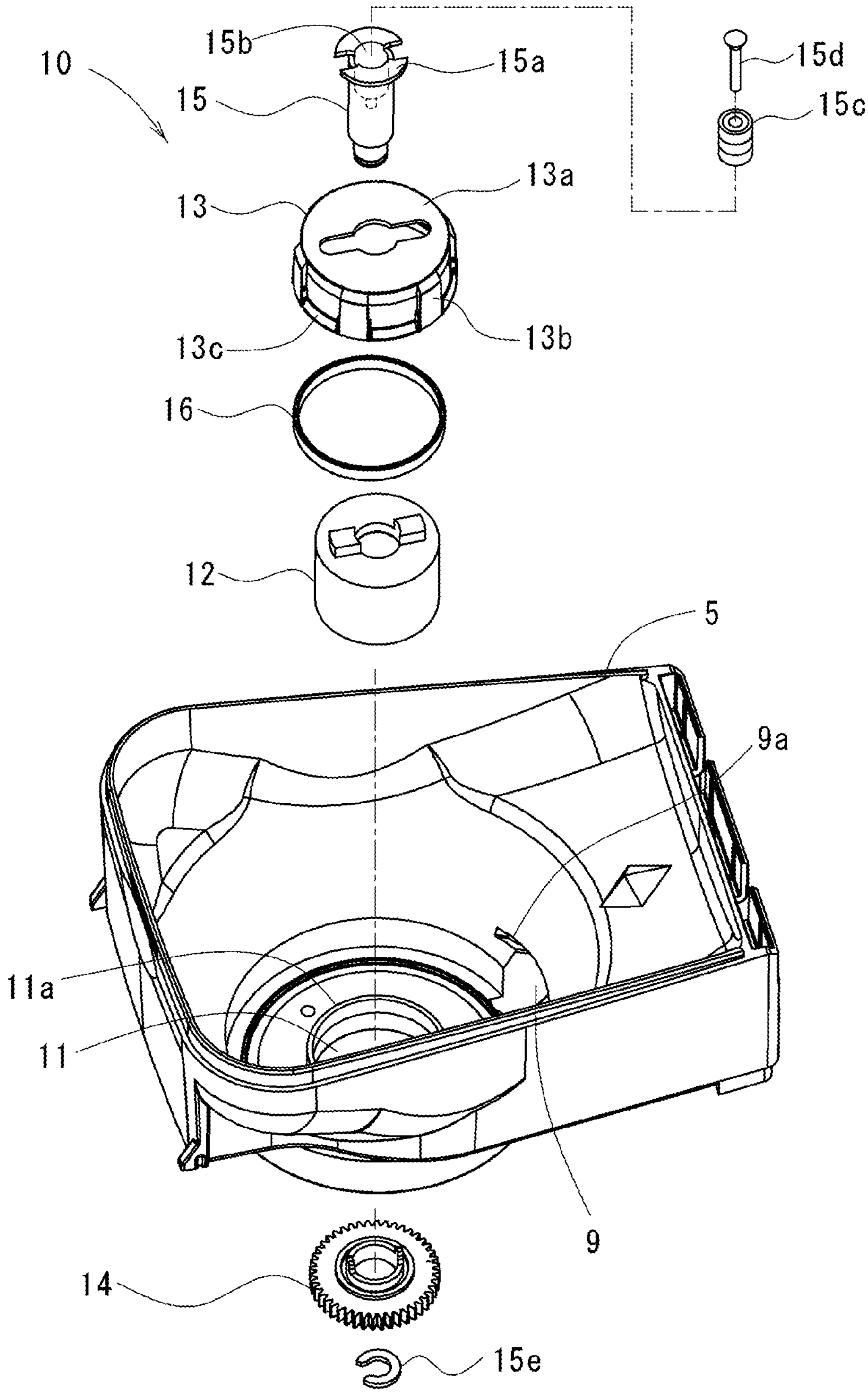
FIG. 7 is an exploded perspective view of a rotor driving part of the cassette body.

As shown in FIG. 7, the rotor driving part 10 is composed of a drive shaft 12 passing through a rotor shaft hole 11, an engagement shaft 13 that engages with an upper end of the drive shaft 12 and rotates integrally with the drive shaft 12, a drive gear 14 that engages with a lower end of the drive shaft 12 and rotates integrally with the drive shaft 12, and a central shaft 15 passing through the engagement shaft 13, the drive shaft 12 and the drive gear 14 to integrate them. The engagement shaft 13 has a circular base portion 13*a* that contacts an upper end surface of the drive shaft 12, engagement pieces 13*b* protruding downward from an outer peripheral edge of the base portion 13*a* and located at six equidistant positions around the circumference thereof, and a connecting portion 13*c* that connects lower ends of the adjacent engaging pieces 13*b*. Inner surfaces of the engaging piece 13*b* and the connecting portion 13*c* are slidably provided on an outer peripheral surface of an annular projection 11*a* provided on an edge of the rotor shaft hole 11 via a ring 16. When the rotor 8 is mounted, the engaging piece 13*b* engages with slits 44*a* between the engaging pieces 44 of the engaging recess 41*a* of the rotor 8 shown in FIG. 10 to transmit the rotational force of the rotor driving part 10 to the rotor 8. A collar 15*a* and a hole 15*b* are formed at an upper end of the central shaft 15. Three stacked annular magnets 15*c* are inserted into the hole 15*b* of the central shaft and fixed with screws 15*d*. The magnets 15*c* may be a single cylindrical magnet. The lower end of the central shaft 15 passes through a gear cover 17 attached to the bottom portion 5*d* of the cassette body 5 shown in FIG. 4 and is retained by a C-shaped retaining ring 15*e*. The drive gear 14 is driven by being engaged with a motor gear 3*d* of the base 3 shown in FIG. 2 via an intermediate gear 18 shown in FIG. 4.

As shown in FIG. 4, the drive gear 14 is engaged with an engaging claw 19*a* at one end of an engaging lever 19 provided on the bottom surface of the cassette body 5. An operating portion 19*b* at the other end of the engaging lever 19 extends in a mounting direction of the tablet cassette 2. When the tablet cassette 2 is mounted on the base 3, the operating portion 19*b* of the engaging lever 19 comes into contact with a predetermined contact portion 3*e* of the base 3 shown in FIG. 2 to rotate the engaging lever 19 against biasing force of a spring 19*c*. As a result, the engaging claw 19*a* is disengaged from the drive gear 14, and the drive gear 14 can be driven to rotate. Further, when the tablet cassette 2 is pulled out from the base 3, the operating portion 19*b* of the engaging lever 19 is separated from the contact portion 3*e* of the base 3, the engaging lever 19 is rotated by the biasing force of the spring 19*c*, the engaging claw 19*a* is engaged with the drive gear 14, and the rotation of the drive gear 14 is prevented. As a result, it is possible to prevent the tablets T from dropping due to unexpected rotation of the rotor 8 of the tablet cassette 2 that has been pulled out.

<Partition Adjusting Mechanism>

Figure 8A:
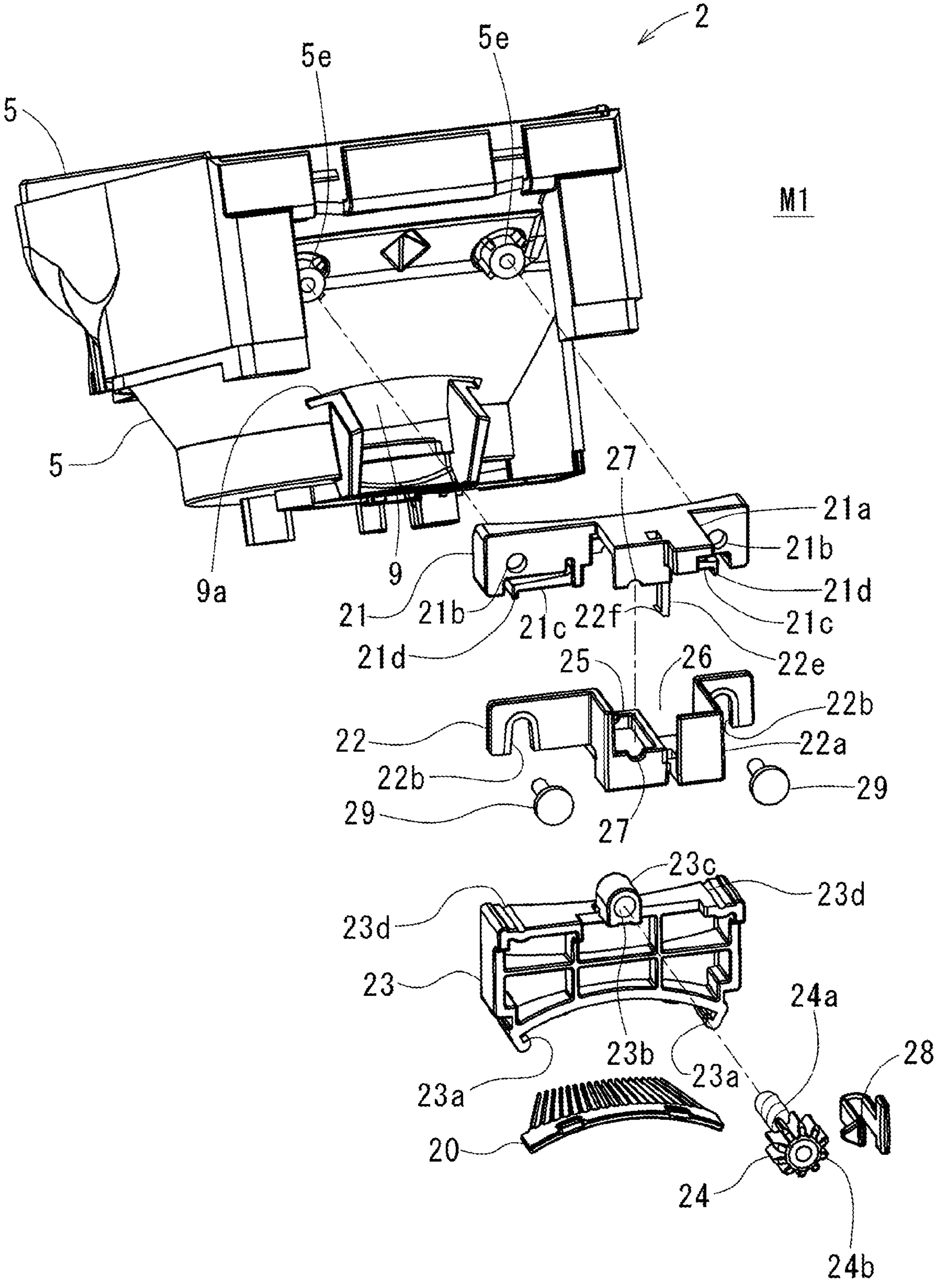
FIG. 8A is an exploded perspective view of a partition adjusting mechanism of the cassette body.

As shown in FIG. 8A, the partition member 20 is formed in a comb shape that is curved upward. The partition member 20 is movable forward and backward with respect to the rotor 8 by the partition adjusting mechanism M1. The partition adjusting mechanism M1 is composed of a first fixing member 21, a second fixing member 22, a movable member 23, and an adjusting member 24.

At a center of the first fixing member 21, an upper case portion 21*a* in which a slide portion 23*c* of the movable member 23 and a stopper 28 are accommodated is formed. Mounting holes 21*b* are formed on both sides of the upper case portion 21*a* of the first fixing member 21. A pair of elastic pieces 21*c* are formed on a lower surface of the first fixing member 21 to press and stabilize the movable member 23. Protrusions 21*d* that engage with grooves 23*d* of the movable member 23 is formed at a tip of the elastic pieces 21*c*.

At a center of the second fixing member 22, a lower case portion 22*b* in which the slide portion 23*c* of the movable member 23 and the stopper 28 are accommodated is formed. Inverted U-shaped cutouts 22*b* are formed in both lower edges of the lower case portion 22*a* of the second fixing member 22. When the upper case portion 21*a* of the first fixing member 21 and the lower case portion 22*a* of the second fixing member 22 are combined with each other, a downwardly opening movable member accommodating portion 25 for accommodating the slide portion 23*c* of the movable member 23 and a stopper accommodating portion 26 for accommodating a stopper 28 are formed. In a lower edge of the upper case portion 21*a* and an upper edge of the lower case portion 22*a* of the movable member accommodating portion 25, semicircular notches 27 are formed to support both ends of the adjusting member 24 in the axial direction so as not to move in the axial direction.

The movable member 23 has holding portions 23*a* for holding the partition member 20 at its lower end and the sliding portion 23*c* having a screw hole 23*b* at its upper end.

The grooves 23*d* are formed at both ends of the upper surface of the movable member 23.

The adjusting member 24 has a threaded portion 24*a* screwed into the screw hole 23*b* of the slide portion 23*c* of the movable member 23 and an engagement gear 24*b*. A stopper 28 is engaged with the engagement gear 24*b* so that it can be fixed at a desired position. The movable member 23 is fixed in the rotational direction of the adjusting member 24 by engaging the grooves 23*d* of the movable member 23 with the projections 21*d* of the first fixing member 21. Therefore, when the adjusting member 24 rotates, the movable member 23 moves in the axial direction of the adjusting member 24.

In order to assemble the partition adjusting mechanism M1, first, the slide portion 23*c* of the movable member 23 is accommodated in the lower case portion 22*a* of the second fixing member 22 from below, and the adjusting member 24 is screwed into and penetrates the slide portion 23*c*. After that, both ends of the adjusting member 24 are placed in the notch 27 of the lower case portion 22. Further, the stopper 28 is accommodated in the lower case portion 22*a* of the second fixing member 22. In this state, when the first fixing member 21 is superimposed on the second fixing member 22 so that the adjusting member 24 passes through the hole formed by the notches 27 of the first fixing member 21 and the second fixing member, a claw 22*f* of an elastic engaging piece 22*e* provided on the upper case portion 21*a* is engaged with the lower edge of the lower case portion 22*a* to be integrally assembled. Further, since a size of the notch 27 is smaller than that of the engagement gear 24*b*, the engagement gear 24*b* is fixed to the upper case portion 22*a* and the lower case portion 22*b* so as not to move in the axial direction. Subsequently, fixing screws 29 are passed through the notch 22*b* of the second fixing member 22 and the mounting holes 21*b* of the first fixing member 21 and screwed into a screw hole 5*e* on the rear surface of the cassette body 5, thereby fixing to the cassette body 5.

Figure 8B:
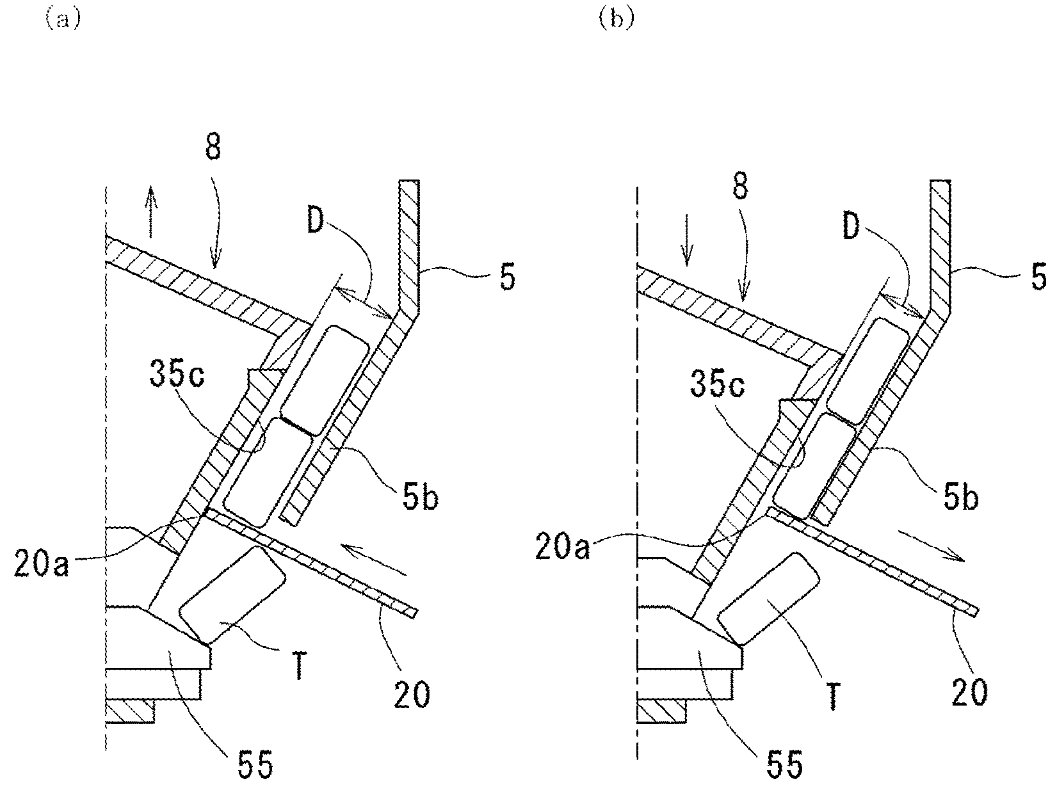
FIG. 8B is a cross-sectional view of the cassette body showing an entry position of the partition member.

When the adjusting member 24 of the partition adjusting mechanism M1 is rotated, the sliding portion 23*c* moves within the movable member accommodating portion 25 of the upper case 21*a* of the first fixing member 21 and the lower case 22*b* of the second fixing member 22. Therefore, as shown in FIG. 8B, the partition member 20 held by the movable member 23 advances or retreats toward the rotor 8 in the cassette body 5, and a tip position 20*a* of the partition member 20 can be adjusted. That is, as shown in FIG. 8B(a), when the tablet T is thick, as will be described later in detail, a rotor body 31 of the rotor 8 is elevated to increase a depth D of the groove of the tablet guide path 8*b* between a lower inclined outer surface 35*c* and the inclined portion 5*b* of the cassette body 5, and along with this, the tip of the partition member 20 is also advanced toward the rotor 8. As shown in FIG. 8B(b), when the tablet T is thin, the rotor body 35 of the rotor 8 is lowered to reduce the depth D of the groove of the tablet guide path 8*b* between the lower inclined outer surface 35*c* and the inclined portion 5*b* of the cassette body 5, and along with this, the tip of the partition member 20 is also retracted from the rotor 8.

<Overall Structure of Rotor>

Figure 9:
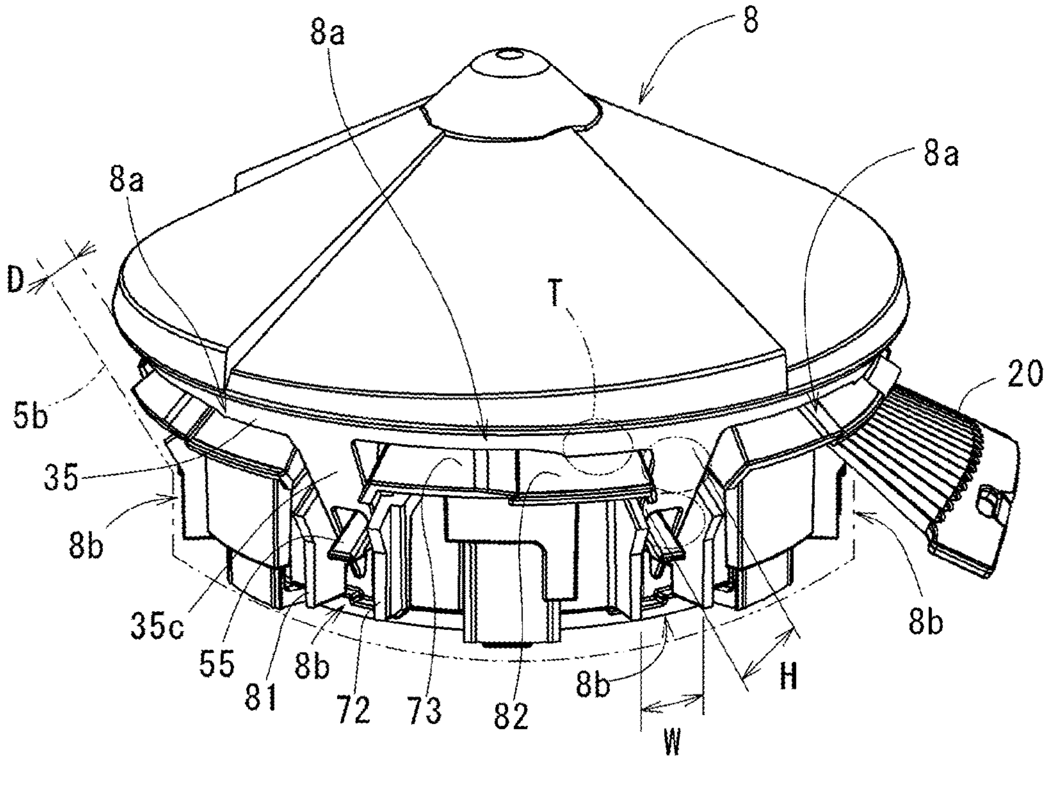
FIG. 9 is an overall perspective view of the rotor.
Figure 10:
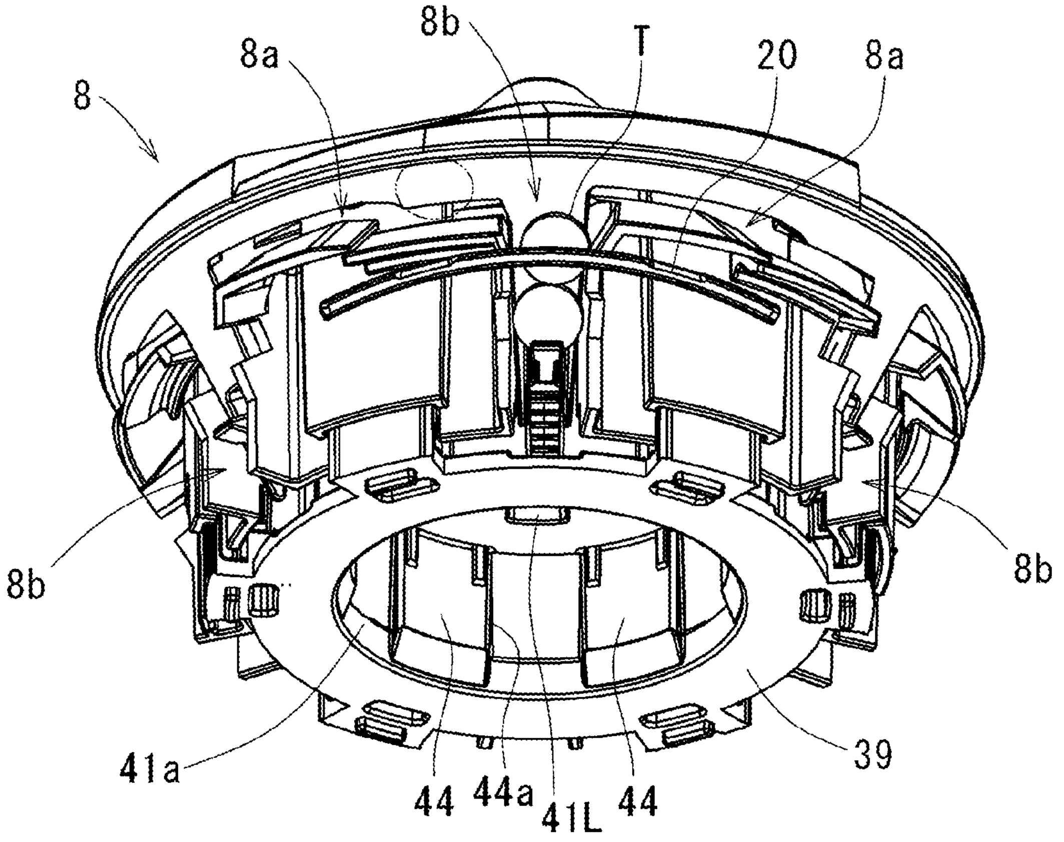
FIG. 10 is a bottom perspective view of the rotor.

As shown in FIGS. 9 and 10, the rotor 8 generally has a conical top surface, an inverted conical side surface, and a flat bottom surface. A tablet pocket 8*a* is provided in the upper side surface of the rotor 8 in the circumferential direction, and a plurality of tablet guide paths 8*b* extending downward from the tablet pocket 8*a* are provided at regular intervals in the circumferential direction.

The tablet pocket 8*a* is formed by an outer peripheral surface of the rotor body 35, which will be described later, and a first horizontal projecting piece 73 of a first movable member 60 and a second horizontal projecting piece 82 of a second movable member 61, which will be described later. Further, the tablet pocket 8*a* is surrounded by the inclined portion 5*b* of the cassette body 5, receives the tablets T accommodated in the cassette body 5, and aligns them in the circumferential direction.

The tablet guide path 8*b* is formed in a groove shape by the lower inclined outer surface 35*c* of the rotor body 35 to be described later, first vertical projecting pieces 72 of the first movable member 60 to be described later, second vertical projecting pieces 81 of the second movable member 61 to be described later and a tablet support table 55 of an annular elevating member 51 to be described later. Further, the tablet guide path 8*b* is covered with the inclined portion 5*b* of the cassette body 5 and receives and guides downward the tablets T aligned in the tablet pockets 8*a*.

The tablet guide path 8*b* is required to adjust the depth, height and width of the groove according to the shape or size of the tablets accommodated in the tablet cassette and to allow the tablet to smoothly pass through the tablet guide path 8*b* and be discharged from the tablet discharge hole 9 shown in FIG. 5. Here, the "depth" of the groove of the tablet guide path 8*b* is the dimension in the thickness direction of the tablet passing through the tablet guide path 8*b* and is the dimension D between the inclined portion 5*b* of the cassette body 5 and the lower inclined outer surface 35*c* of a downward protrusion 35 of the rotor body 31. The "height" of the groove is the dimension in the height direction of the tablet passing through the tablet guide path 8*b* and is the dimension H between the partition member 20 and the tablet support table 55 of the annular elevating member 51 of the rotor 8. The "width" of the groove is the dimension in the width direction of the tablet passing through the tablet guide path 8*b* and is the dimension W between the first vertical projecting piece 72 of the first movable member 60 and the second vertical projecting piece 81 of the second movable member 61.

The rotor 8 has a depth adjusting mechanism M2, a height adjusting mechanism M3, and a width adjusting mechanism M4 to adjust the groove shape of the tablet guide path 8*b*. These will be described in order below.

<Depth Adjusting Mechanism>

Figure 11:
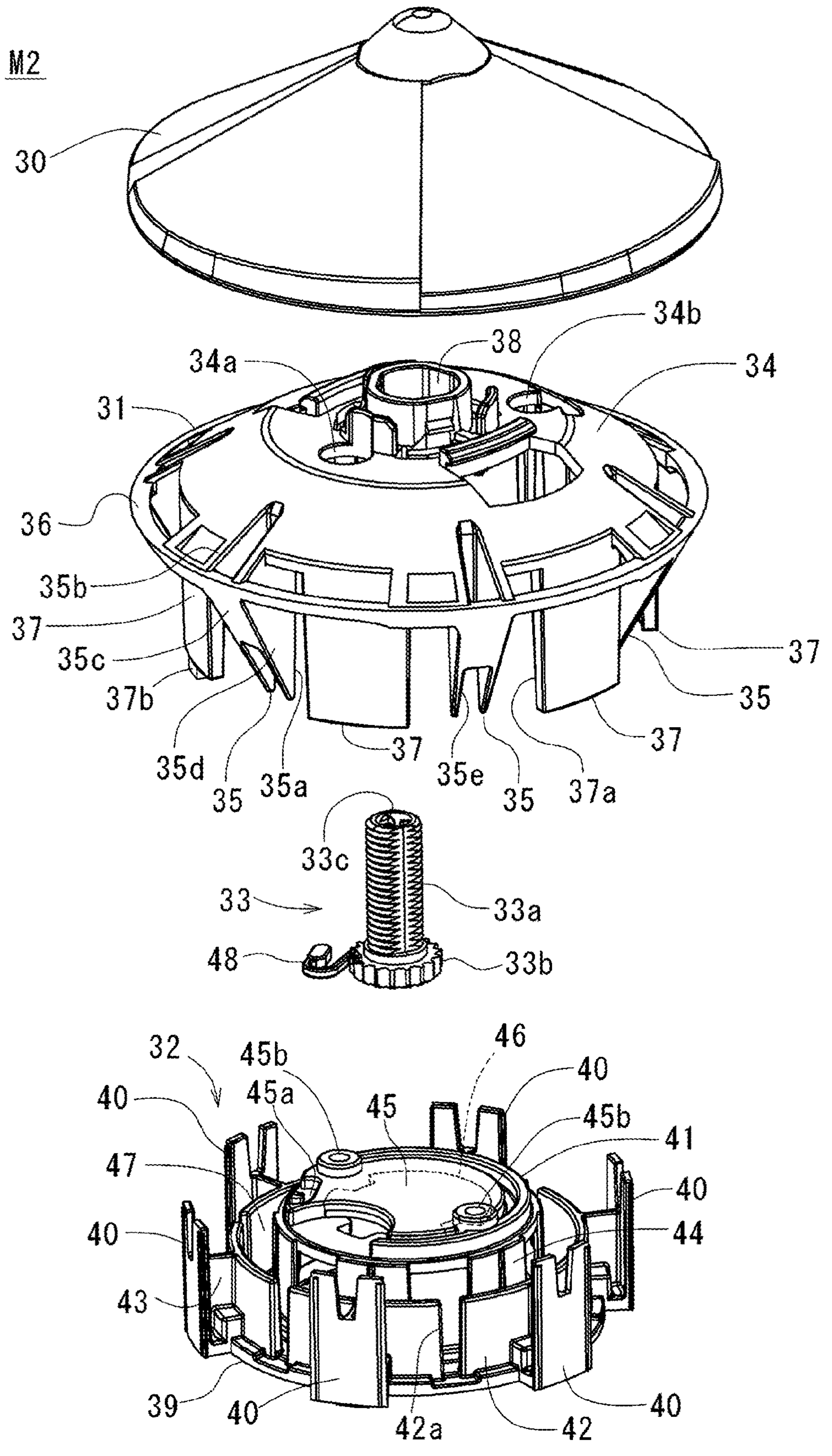
FIG. 11 is an exploded perspective view of a depth adjusting mechanism.

FIG. 11 shows members constituting the depth adjusting mechanism M2. The depth adjusting mechanism M2 is composed of a rotor cover 30, the rotor body 31, a rotor base 32 and a depth adjusting member 33.

The rotor cover 30 has an overall umbrella shape. An upper surface of rotor cover 30 is formed in a conical shape.

The rotor body 31 has a circular base portion 34, downward protrusions 35, an annular portion 36 and guide portions 37.

A shaft portion 38 is provided in a center of the base portion 34 and a threaded hole (not shown) is formed in the shaft portion 38. Two holes 34*a* and 34*b* are formed in an upper surface of the base portion 34 to expose a height adjusting member 52 and a width adjusting member 64, which will be described later.

The downward protrusions 35 extend downward from six equidistant positions on an outer peripheral edge of the base portion 34. The downward protrusion 35 has a vertical inner surface 35*a*, an upper inclined outer surface 35*b* that slopes downward from the outer peripheral edge of the base portion 34, and a lower inclined outer surface 35*c* that slopes downward and inward from a lower end of the upper sloped outer surface 35*b* and both side surfaces 35*d* and is formed in a triangular shape when viewed from the side. The lower inclined outer surface 35*c* forms a bottom surface of the groove of the tablet guide path 8*b*. A slit 35*e* is formed at the lower end of the downward protrusion 35.

The annular portion 36 is concentrically formed on an outside of the base portion 34 and connected to the base portion 34 via the downward protrusions 35.

The guide portions 37 extend downward from six equidistant positions on the outer peripheral edge of the base portion 34 between the downward protrusions 35. On both sides of an inner surface of the guide portion 37, guide edges 37*a* with which guide pieces 40 of the rotor base 32, which will be described later, are slidably engaged are formed. The rotor body 31 and the rotor base 32 are integrally rotated by the engagement between the guide piece 40 and the guide edge 37*a*. At a lower end of any one of the six guide portions 37, a protrusion 37*b* serving as a detection portion for detecting a zero point is formed.

The rotor base 32 has an annular base portion 39, the guide pieces 40 and engaging portion 41.

An annular wall 42 is formed on an upper surface of the base portion 39. Vertical slits 42*a* extending in the axial direction are formed in the annular wall 42 at six equidistant positions around the around the circumference of the annular wall 42.

The guide pieces 40 protrude upward between the adjacent vertical slits 42*a* at six equidistant positions around the outer peripheral edge of the base portion 39. The guide piece 40 is formed so as to be slidably engaged with the guide edge 37*a* of the guide portion 37 of the rotor body 31. Reinforcing ribs 43 are provided between the guide pieces 40 and the annular wall 42.

The engaging portion 41 has an engaging pieces 44 that rise upward from six equidistant positions around the inner peripheral edge of the base portion 39 and a circular protrusion 45 that is provided at upper ends of the engaging pieces 44. The engaging portion 41 forms an engaging concave portion 41*a* with which the rotor driving part 10 engages as shown in FIG. 10 when viewed from the rear side. The engaging pieces 13*b* of the rotor driving part 10 are engaged with the slits 44*a* between the adjacent engaging pieces 44. A magnetic plate 46 that is attracted to the magnets 15*c* provided on the central shaft 15 of the rotor drive part 10 is embedded in the circular protrusion 45. the depth adjusting member 33 is supported at a center of the upper surface of the circular protrusion 45. The circular protrusion 45 is formed with a hole 45*a* for accommodating a stopper 48 that prevents free rotation of the depth adjusting member 33 and two screw holes 45*b* into which screws (not shown) inserted through two screw insertion holes 93 of a second support member 63, which will be described later, are screwed.

An annular concave portion 47 is formed between the circular protrusion 45 and the annular wall 42 to accommodate a height adjusting mechanism M3, which will be described later.

The depth adjusting member 33 has a male screw portion 33*a* and a lower end gear portion 33*b*. The male screw portion 33*a* is screwed into a threaded hole (not shown) of the shaft portion 38 of the rotor body 31, and the gear portion 33*b* at the lower end is supported by the circular protrusion 45 of the rotor base 32. An engaging portion 33*c* is formed at an upper end of the male threaded portion 33*a*, which protrudes and is exposed from the shaft portion 38 of the rotor body 31, so that the rotation can be adjusted from the outside. A tip of the stopper 48 made of an elastic piece is engaged between the teeth of the gear portion 33*b*.

In the depth adjusting member 33, the axial movement of the gear portion 33*b* is restrained by a first support member 62 and the rotor base 32, and the rotation of the rotor body 31 with respect to the rotor base 32 is restrained by engaging the guide edges 37*a* of the rotor body 31 with the guide pieces 40 of the rotor base 32. In this way, when the depth adjusting member 33 is rotated in a state that the rotor base 32 is not rotating, the rotor body 31 having a threaded hole (not shown) that is screwed with the male threaded portion 33*a* of the depth adjusting member 33 is elevated or lowered in the rotation axis direction of the rotor 4. Along with this, the lower inclined outer surface 35*c* of the downward protrusion 35 of the rotor body 31, which forms the bottom surface of the tablet guide path 8*b*, is also elevated or lowered.

Figure 14:
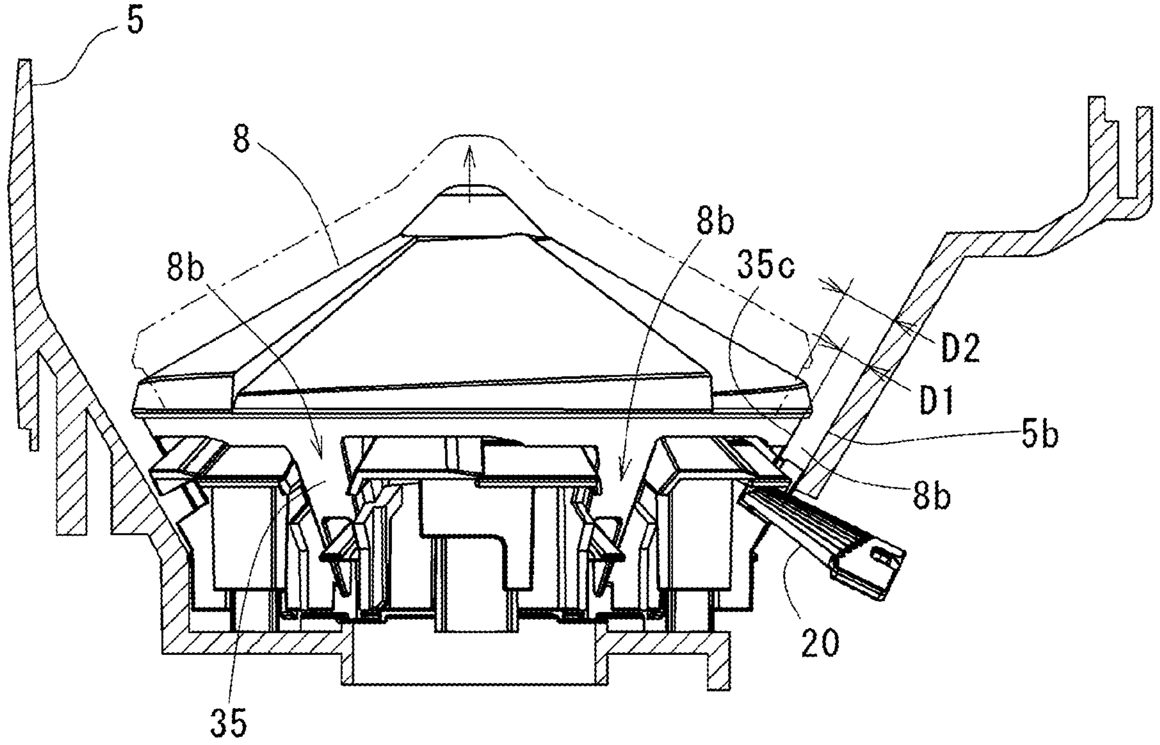
FIG. 14 is a cross-sectional view of the cassette body for explaining a state of depth adjustment by the depth adjusting mechanism.

Referring to FIG. 14, the lower inclined outer surface 35*c* of the downward protrusion 35 is radially inclined from the outside to the inside from top to bottom and is parallel to the inverted conical inclined portion 5*b* of the cassette body 5. Therefore, when the lower inclined outer surface 35*c* of the downward protrusion 35 of the rotor body 31 is lowered, a distance between the lower inclined outer surface 35*c* of the downward protrusion 35 and the conical inclined portion 5*b* of the cassette body 5 is reduced, and the depth of the tablet guide path 8*b* can be made shallow (D1). Conversely, when the lower inclined outer surface 35*c* of the downward protrusion 35 of the rotor body 31 is elevated, the distance between the lower inclined outer surface 35*c* of the downward protrusion 35 and the inverted conical inclined portion 5*b* of the cassette body 5 is increased, and the depth of the tablet guide path 8*b* can be increased (D2). By rotating the depth adjusting member 33 to the left or right in this manner, the depth of the tablet guide path 8*b* can be adjusted according to the thickness of the tablet T passing through the tablet guide path 8*b*. Each time the gear portion 33*b* of the depth adjusting member 33 shown in FIG. 11 rotates, the tip of the stopper 48 climbs over the teeth of the gear portion 33*b* and engages between the teeth. Therefore, the depth adjusting member 33 can be stopped at an appropriate position to fix the rotor body 35 at a desired height position.

<Height Adjustment Mechanism>

Figure 12:
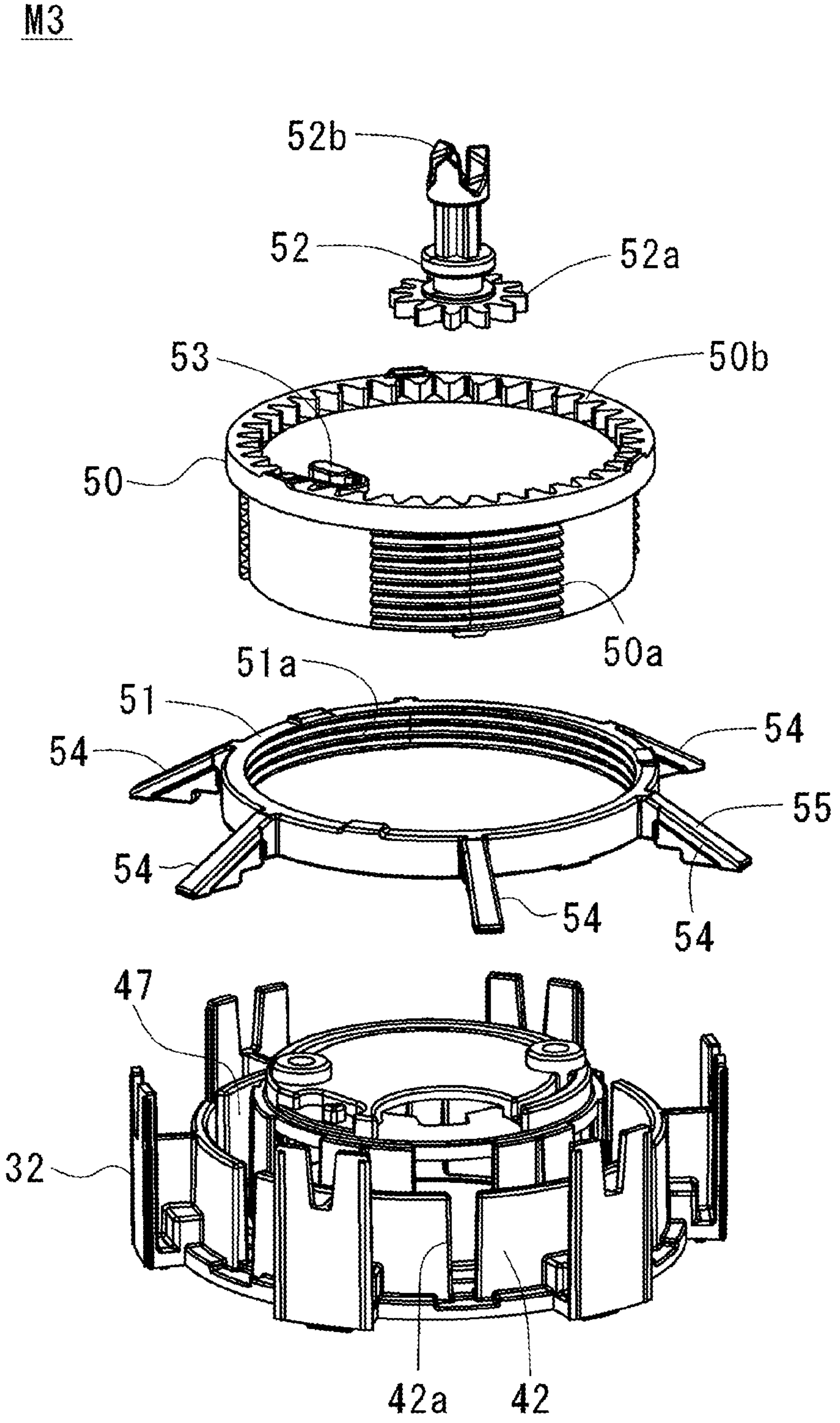
FIG. 12 is an exploded perspective view of a height adjusting mechanism.

FIG. 12 shows members constituting the height adjusting mechanism M3. The height adjusting mechanism M3 is composed of a cylindrical rotating member 50, an annular elevating member 51, and a height adjusting member 52.

The cylindrical rotating member 50 has a male threaded portion 50*a* formed on a lower outer circumference thereof and a driven gear 50*b* formed on an upper inner circumference thereof. A stopper 53 for preventing free rotation of the cylindrical rotating member 50 is engaged with the driven gear 50*b*.

The annular elevating member 51 has arms 54 protruding radially at six equidistant positions on the outer periphery thereof and a tablet support table 55 is formed at a tip of each arm 54. The tablet support table 55 is inclined perpendicular to the tablet guide path 8*b* so as to support the lowermost tablet T in the tablet guide path 8*b*. A female threaded portion 51*a* is formed on the inner surface of the annular elevating member 51 so as to be screwed with the male threaded portion 50*a* of the cylindrical rotating member 50.

The height adjusting member 52 has a drive gear 52*a* that meshes with the driven gear 50*b* of the cylindrical rotating member 50 at a lower end of the height adjusting member 52. An engaging portion 52*b* is formed at an upper end of the height adjusting member 52, which protrudes and is exposed from the holes 34*a* in the upper surface of the base portion 34 of the rotor body 31, so that the rotation can be adjusted from the outside. The height adjusting member 52 is held by an edge of a hole 90 of the second support member 63 to be described later so as not to move vertically.

The cylindrical rotating member 50 and the annular elevating member 51 are accommodated in the annular concave portion 47 of the rotor base 32 while being screwed together. The arm 54 of the annular elevating member 51 is slidably fitted into the slit 42*a* of the annular wall 42 of the rotor base 32, and the tablet support table 55 protrudes outside the annular wall 42 of the rotor base 32 and supports the lowermost tablet T in the tablet guide path 8*b*.

Figure 15:
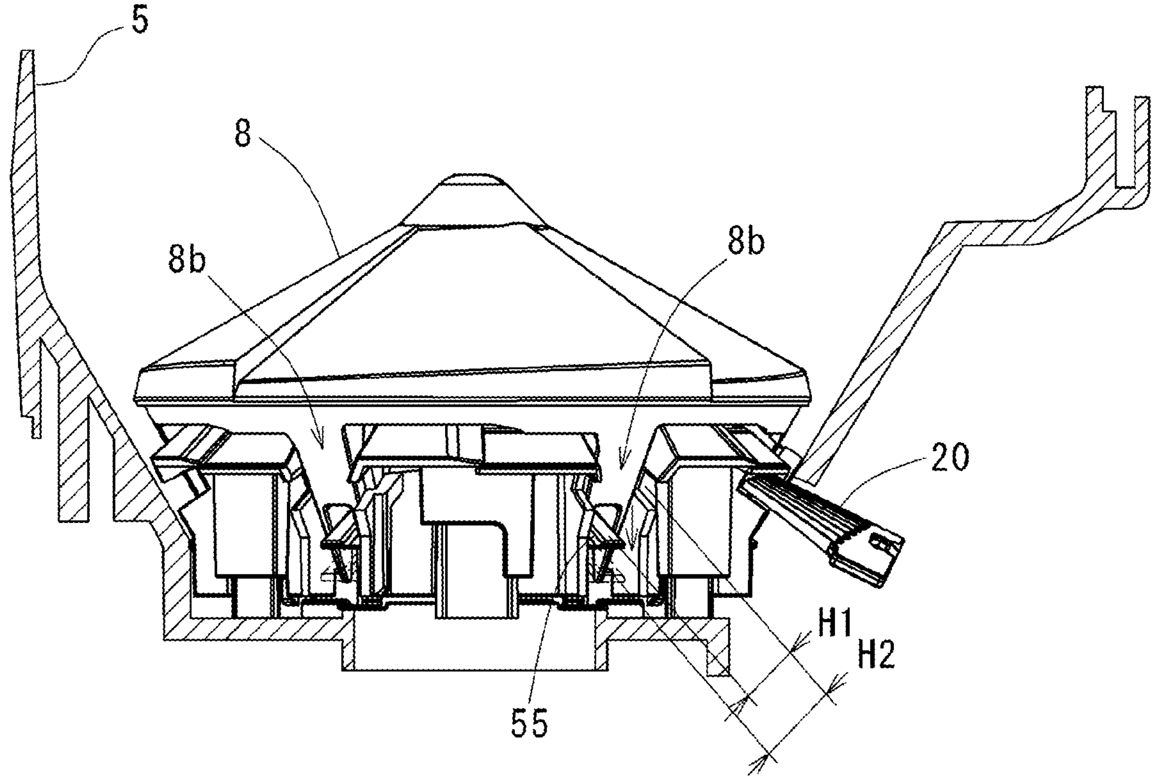
FIG. 15 is a cross-sectional view of the cassette body for explaining a state of height adjustment by the height adjusting mechanism.

As shown in FIG. 15, in order to adjust the height H of the tablet guide path 8*b* corresponding to the height of the tablet T, the height adjusting member 52 of the height adjusting mechanism M3 is rotated left or right. In the present invention, since the partition member 20 is fixed to the cassette body 5 in the height direction, in order to adjust the height H of the tablet guide path 8*b*, the tablet support table 55 below the partition member 20 is elevated and lowered to adjust the distance between the partition member 20 and the tablet support table 55 instead of moving the partition member 20 itself. Thereby, the height H of the partition member 20 from the tablet support table 55 of the tablet guide path 8*b* is adjusted.

When the height adjusting member 52 is rotated, the cylindrical rotating member 50 is rotated. The vertical movement of the cylindrical rotating member 50 is restrained by the second support member 63 and the rotor base 32. The annular elevating member 51 having the female threaded portion 51*a* screwed into the male threaded portion 50*a* of the cylindrical rotating member 50 has the arms 54 passing through the slits 42*a* in the annular wall 42 of the rotor base 32, and the rotation of the annular elevating member 51 is restrained. Therefore, the rotation of the cylindrical rotating member 50 elevates or lowers the annular elevating member 51, and the tablet support table 55 of the annular elevating member 51 is elevated or lowered.

That is, as shown in FIG. 15, when the cylindrical rotating member 50 rotates in one direction, the tablet support table 55 of the annular elevating member 51 is elevated, and the position of the partition member 20 relative to the tablet support table 55, that is, the height is lowered (H1). Conversely, when the cylindrical rotating member 50 rotates in the other direction, the tablet support table 55 of the annular elevating member 51 is lowered, and the position of the partition member 20 relative to the tablet support table 55, that is, the height becomes higher (H2). Each time the cylindrical rotating member 50 rotates due to the rotation of the height adjusting member 52, the tip of the stopper 53 climbs over the teeth of the driven gear 50*b* of the cylindrical rotating member 50 and engages between the teeth. Thus, by stopping the height adjusting member 52 at an appropriate position, the tablet support table 55 can be fixed at a desired height position.

<Width Adjusting Mechanism>

Figure 13:
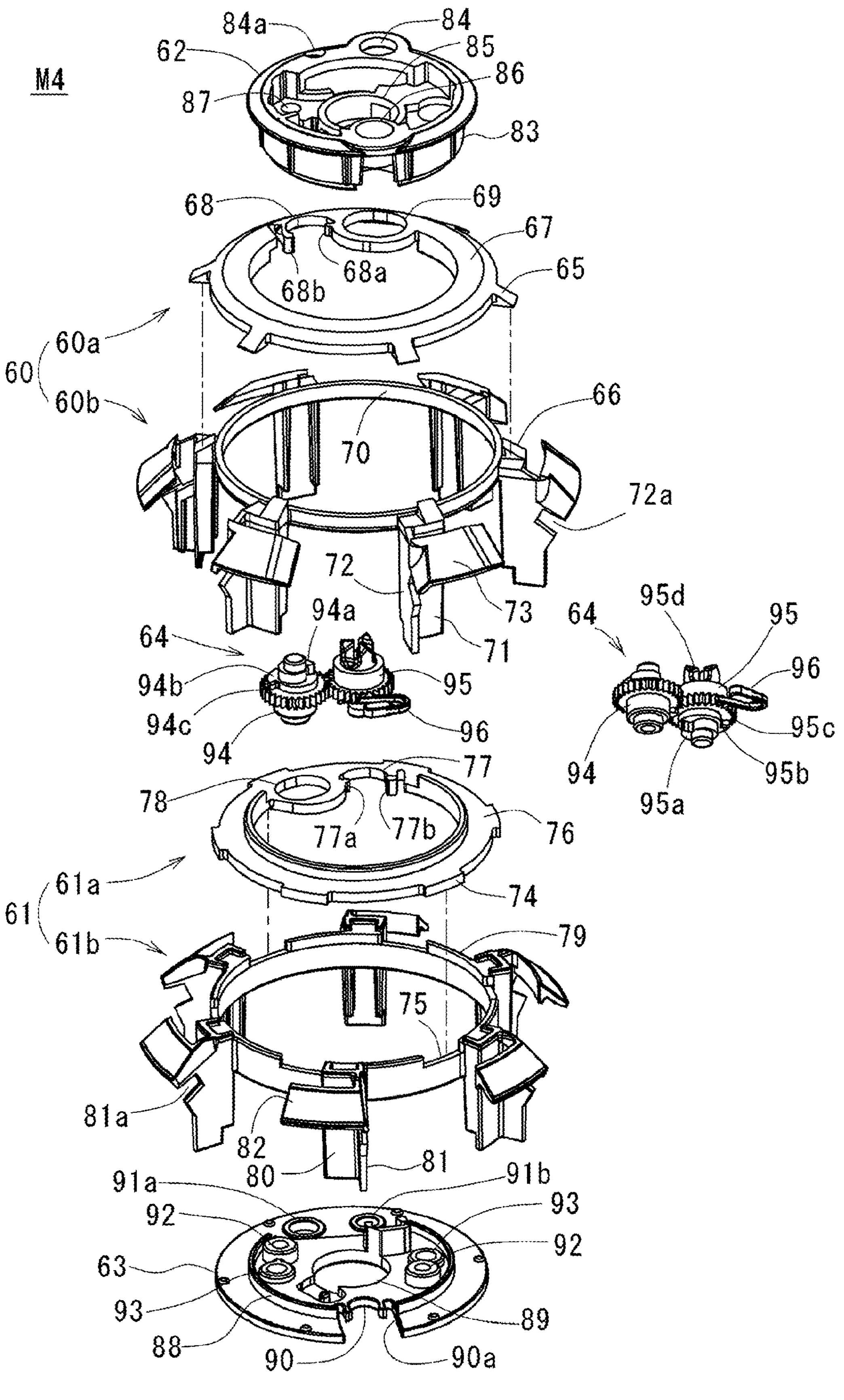
FIG. 13 is an exploded perspective view of a width adjusting mechanism.

FIG. 13 shows members constituting the width adjusting mechanism M4. The width adjusting mechanism M4 is composed of the first movable member 60, the second movable member 61, the first support member 62, the second support member 63 and a width adjusting member 64.

As shown in FIG. 13, the first movable member 60 consists of an upper member 60*a* and a lower member 60*b*, and engagement protrusions 65 of the upper member 60*a* and the engagement protrusions 66 of the lower member 60*b* are engaged with each other so that they can rotate integrally.

In the upper member 60*a* of the first movable member 60, a substantially semicircular notch 68 and an elongated hole 69 are formed adjacent to each other on an inner circumference of an annular base portion 67. An A projection 68*a* and a B projection 68*b*, which face each other in the circumferential direction of the first movable member 60, are formed on edges of the notch 68 facing the center of the notch 68 when viewing the first movable member 60 from above. The A projection 68*a* and the B projection 68*b* serve as a cam follower that are in sliding contact with an A cam 94*a* and a B cam 94*b* of a first adjusting shaft 94, which will be described later.

The lower member 60*b* of the first movable member 60 has an annular base portion 70, six wall portions 71, first vertical projecting pieces 72 and first horizontal projecting pieces 73. The six wall portions 71 protrude downward from an outer peripheral edge of the base portion 70 at six equidistant positions. The first vertical protruding pieces 72 protrude outward from a left end of the wall portion 71 when viewed from the front and forms the right side surface of the tablet guide path 8*b*. The first vertical projecting pieces 72 are formed with a notch 72*a* into which the partition member 20 is fitted. The first horizontal protruding pieces 73 extend horizontally in the circumferential direction from an upper end of the first vertical protruding pieces 72 toward a right side when viewed from the front and form the bottom surface of the aforementioned tablet pocket 8*a*.

The second movable member 61, like the first movable member 60, consists of an upper member 61*a* and a lower member 61*b*, and engagement protrusions 74 of the upper member 61*a* and engagement concave portions 75 of the lower member 61*b* are engaged with each other so that they can rotate integrally.

In the upper member 61*a* of the second movable member 61, a substantially semicircular notch 77 and an elongated hole 69 are formed adjacent to each other on an inner circumference of an annular base portion 77. An A projection 77*a* and a B projection 77*b*, which face each other in the circumferential direction of the second movable member 61, are formed on edges of the notch 77 facing the center of the notch 77 when viewing the second movable member 60 from above. The A projection 77*a* and the B projection 77*b* serve as a cam follower that are in sliding contact with an A cam 95*a* and a B cam 95*b* of a second adjusting shaft 95, which will be described later.

The lower member 61*b* of the second movable member 61 has an annular base portion 79, six wall portions 80, second vertical projecting pieces 81 and second horizontal projecting pieces 82. The six wall portions 80 protrude downward from an outer peripheral edge of the base portion 79 at six equidistant positions. The second vertical protruding pieces 81 protrude outward from a right end of the wall portion 80 when viewed from the front and forms the left side surface of the tablet guide path 8*b*. The second vertical projecting pieces 81 are formed with a notch 81*a* into which the partition member 20 is fitted. The second horizontal protruding pieces 82 extend horizontally in the circumferential direction from an upper end of the second vertical protruding pieces 81 toward a left side when viewed from the front and form the bottom surface of the tablet pocket 8*a* described above together with the first horizontal projecting pieces 73 of the first movable member 60. A tip of the second horizontal projecting piece 82 of the second movable member 61 is formed so as to overlap a tip of the first horizontal projecting piece 73 of the first movable member 60.

The first support member 62 has a circular shape with an outer diameter larger than the inner diameter of the upper member 60*a* of the first movable member 60 and has a circular protrusion 83 on its lower surface. At a center of the first support member 62, holes 84 and 84*a* through which the width adjusting member 64 (to be described later) pass, a hole 85 through which the depth adjusting member 33 of the depth adjusting mechanism M2 passes, a hole 86 through which the height adjusting member 52 of the height adjusting mechanism M3 passes, and two screw holes 87 are formed.

The second support member 63 has a circular shape with an outer diameter larger than the inner diameter of the upper member 60*a* of the first movable member 60 and has an annular protrusion 88 formed on its upper surface into which the circular protrusion 83 of the first support member 62 is fitted. At a center of the second support member 63, a hole 89 through which the depth adjusting member 33 of the depth adjusting mechanism M2 passes, a hole 90 and a notch 90*a* through which the height adjusting member 52 of the height adjusting mechanism M3 pass, a hole 91*a* through which the first adjusting shaft 94 of the width adjusting member 64, which will be described later, passes, a hole 91*b* into which second adjustment shaft 95 is fitted, two screw holes 92 into which screws (not shown) inserted through the two screw insertion holes 87 of the first support member 62 are screwed, and two screw holes 93 are formed.

By inserting a screw (not shown) from the screw insertion hole 87 of the first support member 62 into the screw hole 92 of the second support member 63 and tightening it, the first support member 62 and the second support member 63 are integrated with the first movable member 60 and the second movable member 61 sandwiched therebetween.

Further, by inserting a screw (not shown) from the screw insertion hole 93 of the second support member 63 into the screw hole 45*b* of the rotor base 32 and tightening it, the second support member 63 is fixed to the rotor base 32, and the cylindrical rotating member 50 of the height adjusting mechanism M3 is held between the second support member 63 and the rotor base 32 and axial movement thereof is restrained.

The width adjusting member 64 is composed of the first adjusting shaft 94 and the second adjusting shaft 95. The first adjusting shaft 94 is arranged within the notch 68. The second adjusting shaft 95 is arranged inside the elongated hole 69. The second adjusting shaft 95 is provided with a stopper 96 that prevents the width adjusting member 64 from freely rotating.

Figure 16:
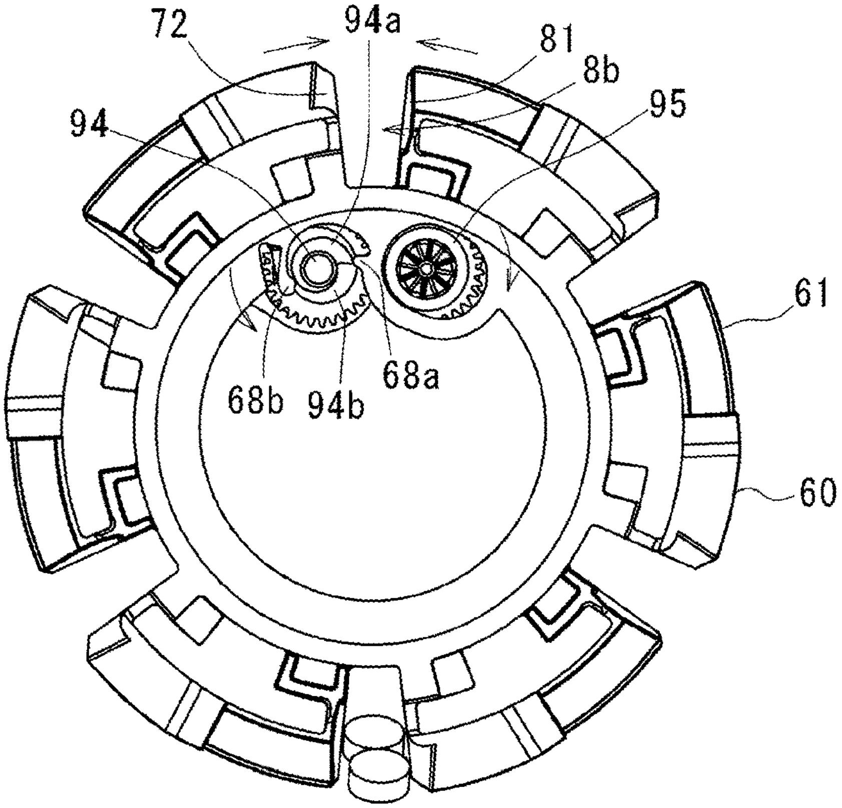
FIGS. 16(*a*) and 16(*b*) are a plan view and a bottom view of a movable member and the width adjusting member for explaining a state of width adjustment by the width adjusting mechanism.
Figure 16:
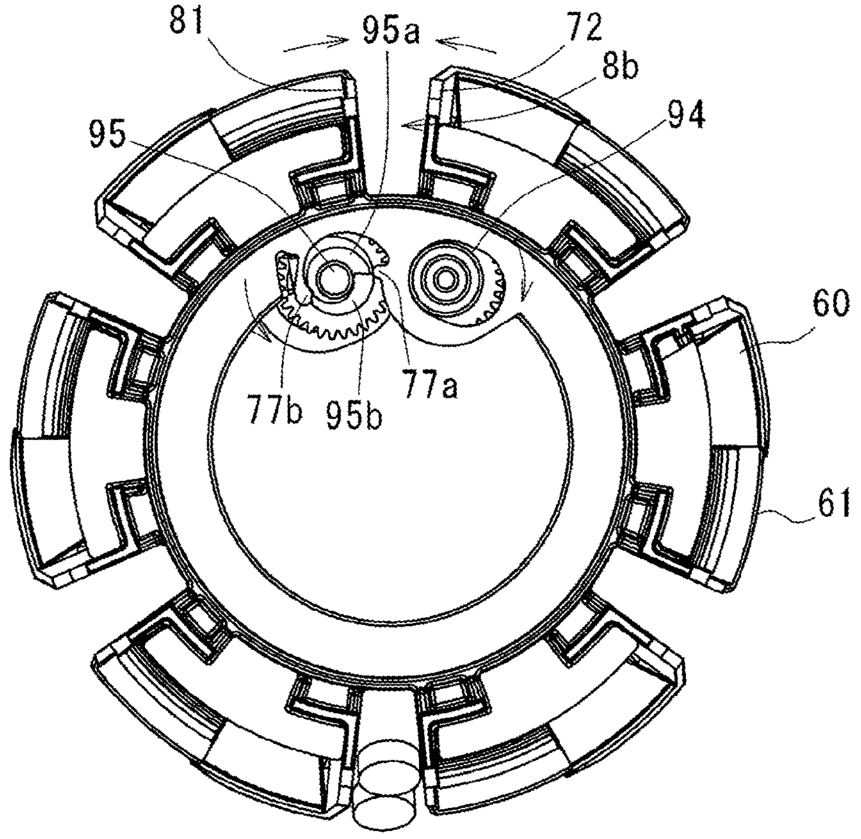

The first adjusting shaft 94 is formed with the A cam 94*a*, the B cam 94*b* and a gear 94*c* in order from the upper end. As shown in FIG. 16, the A cam 94*a* is formed so that the radius of the cam surface increases within a range of 360° clockwise when the width adjusting member 64 is viewed from above and is in sliding contact with the A projection 68*a* of the first movable plate 60. The B cam 94*b* is formed so that the radius of the cam surface increases within a range of 360° counterclockwise when the width adjusting member 64 is viewed from above and is in sliding contact with the B projection 68*b* of the first movable plate 60. The maximum radius portion of the A cam 94*a* and the maximum radius portion of the B cam 94*b* are located 180 degrees apart. The upper end of the first adjusting shaft 94 is supported by a hole 84*a* of the first support member 62 and the lower end is supported by a hole 91*a* of the second support member 63.

Similarly, the second adjusting shaft 95 is formed with the A cam 95*a*, the B cam 95*b*, a gear 95*c* and an engaging portion 95*d* in order from the lower end. The A cam 95*a* is formed so that the radius of the cam surface increases within a range of 360° clockwise when the width adjusting member 64 is viewed from below and is in sliding contact with the A projection 77*a* of the second movable member 61. The B cam 95*b* is formed so that the radius of the cam surface increases within a range of 360° counterclockwise when the width adjusting member 64 is viewed from below and is in sliding contact with the B projection 77*b* of the second movable plate 61. The maximum radius portion of the A cam 95*a* and the maximum radius portion of the B cam 95*b* are located 180 degrees apart. The gear 95*c* of the second adjusting shaft 95 is configured to mesh with and interlock with the gear 94*c*. The upper end of the second adjusting shaft 95 passes through the hole 69 of the first support member 62, protrudes from the rotor body 31 and is exposed through the hole 34*a*, so that the rotation can be adjusted from the outside. The lower end of the second adjusting shaft 95 is supported in the hole 91*b* of the second support member 63. The upper end of the first adjusting shaft 94 may pass through the first support member 62 and protrude from the rotor body 35 to be exposed so that the rotation can be adjusted from the outside.

When the second adjusting shaft 95 is rotated clockwise in FIG. 16(*a*), the rotational force is transmitted from the gear 95*c* of the second adjusting shaft 95 to the gear 94*c* of the first adjustment shaft 94 and the first adjusting shaft 94 rotates counterclockwise. Since the A cam 94*a* of the first adjusting shaft 94 slides against and presses the A projection 68*a* of the first movable member 60 due to the rotation of the first adjusting shaft 94, the first movable member 60 rotates clockwise in FIG. 16(*a*). On the other hand, since the A cam 95*a* of the second adjusting shaft 95 slides against and presses the A projection 77*a* of the second movable member 61 due to the rotation of the second adjusting shaft 95 as shown in FIG. 16(*b*), the second movable member 61 rotates clockwise in FIG. 16(*b*) and counterclockwise in FIG. 16(*a*).

Subsequently, when the second adjusting shaft 95 is rotated counterclockwise in FIG. 16(*a*), the rotational force is transmitted from the gear 95*c* of the second adjusting shaft 95 to the gear 94*c* of the first adjusting shaft 94 and the first adjusting shaft 94 rotates clockwise. Since the B cam 94*b* of the first adjusting shaft 94 slides against and presses the B projection 68*b* of the first movable member 60 due to the rotation of the first adjustment shaft 94, the first movable member 60 rotates counterclockwise in FIG. 16(*a*). On the other hand, since the B cam 95*b* of the second adjusting shaft 95 slides against and presses the B projection 77*b* of the second movable member 61 due to the rotation of the second adjusting shaft 95 as shown in FIG. 16(*b*), the second movable member 61 rotates counterclockwise in FIG. 16(*b*) and clockwise in FIG. 16(*a*).

Thus, the first movable member 60 and the second movable member 61 rotate in opposite directions, and the distance between the first vertical projecting piece 72 of the first movable member 60 and the second vertical projecting piece 81 of the second movable member 61, that is, the width of the tablet guide path 8*b* can be enlarged or reduced.

Next, the operation of the rotor 8 in the tablet cassette 2 configured as above will be described.

As described above, the tablet pocket 8*a* extending in the circumferential direction on the upper side surface of the rotor 8 and a plurality of tablet guide paths 8*b* extending downward from the upper side surface of the rotor 8 are provided between the cassette body 5 and the rotor 8 shown in FIG. 5.

Referring to FIG. 5, the tablets T stored in the cassette body 5 enter the tablet pocket 8*a* while being stirred by the rotation of the rotor 8, and the tablets T enter the tablet guide path 8*b* from the tablet pocket 8*a*. When the tablet guide path 8*b* approaches the tablet discharge hole 9, the partition member 20 fixed to the cassette body 5 enters between the lowermost tablet T in the tablet guide path 8*b* and the tablets T above the lowermost tablet T. The tablets T above the partition member 20 are prevented from falling downward by the partition member 20. The lowermost tablet T below the partition member 20 is on the tablet support table 55, but since the tablet support table 55 is inclined, the tablet falls down on the tablet support table 55 toward the tablet discharge hole 9, and the tablet is discharged from the tablet discharge hole 9. The tablet T discharged from the tablet discharge hole 7 is discharged through the tablet discharge path 3*c* of the base 2 shown in FIG. 2. As a result, each time the tablet guide path 8*b* turns to the tablet discharge hole 9, the tablet T is discharged one by one. By adjusting the rotation angle of the rotor 8, the number of tablets T corresponding to the prescription can be dispensed.

The tablet guide path 8*b* can adjust the entry position of the partition member 20 with respect to the thickness of the tablet T, the depth D corresponding to the thickness of the tablet T, the height H corresponding to the height of the tablet and the width W corresponding to the width of the tablet T using the partition adjusting mechanism M1, the depth adjusting mechanism M2, the height adjusting mechanism M3 and the width adjusting mechanism M4. Therefore, the tablet guide path 8*b* can be appropriately sized according to the shape or size of the tablets T to be stored in the cassette body 5. By using the same tablet cassette 2 or rotor 8 and adjusting the tablet guide path 8*b* to match various tablets T, the tablets can be discharged without exchanging the entire tablet cassette 2 or the rotor 8 for each different tablet T. Such adjustments can be made automatically by a tablet guide path adjusting device described below.

<Tablet Guide Path Adjusting Device>

Figure 17:
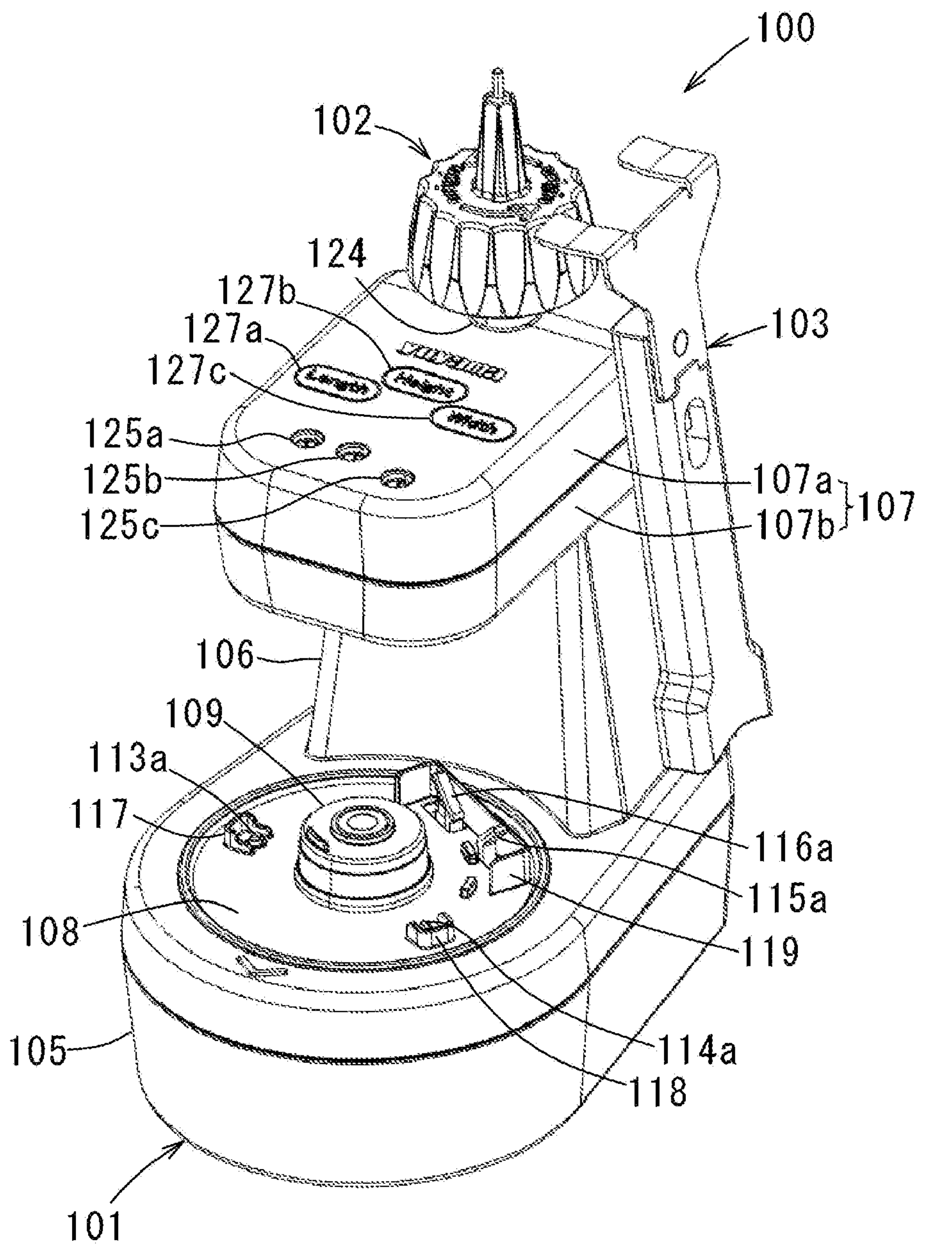
FIG. 17 is a perspective view of the tablet guide path adjusting device as seen obliquely from a front side.

FIG. 17 shows a tablet guide path adjusting device 100 for a tablet cassette according to the present invention.

The tablet guide path adjusting device 100 is for manually adjusting the depth, height and width of the groove of the tablet guide path 8*b* of the tablet cassette 2 already described and the entry position of the partition member 20.

That is, the tablet guide path adjusting device 100 engages with the engaging portions 33*c*, 52*b* and 95*d* of the adjusting members 33, 52 and 64 of the respective adjusting mechanisms M2, M3 and M4 for adjusting the depth, height, and width of the groove of the tablet guide path 8*b* of the tablet cassette 2 to operate the adjusting mechanism and adjusts the dimensions of the tablet guide path 8*b* according to the shape or size of the tablets T stored in the cassette body 5. Further, the tablet guide path adjusting device 100 engages with the engagement gear 24*b* of the partition adjusting member 24 of the partition adjusting mechanism M1 for adjusting the entry position of the partition member 20 to operate the partition adjusting mechanism M1, and the entry position of the partition member 20 is adjusted according to the shape or size of the tablets T contained in the cassette body 5 and the depth of the groove of the tablet guide path 8*b*.

The tablet guide path adjusting device 100 includes a device body 101, an adjusting member 102, a tool 103 and a control device 200.

The device body 101 has a base portion 105, an intermediate portion 106 rising upward from a rear portion of the base portion 105 and a guide portion 107 projecting forward from an upper end of the intermediate portion 106.

An upper surface of the base portion 105 serves as a rotor table 108 on which the rotor 8 of the tablet cassette 2 is placed. A rotor mounting protrusion 109 is provided on an upper surface of the rotor table 108. The rotor mounting protrusion 109 has the same shape as the engagement shaft 13 of the rotor drive part 10 of the cassette body 5 and is adapted to mount the tablet cassette 2 thereon.

Figure 19:
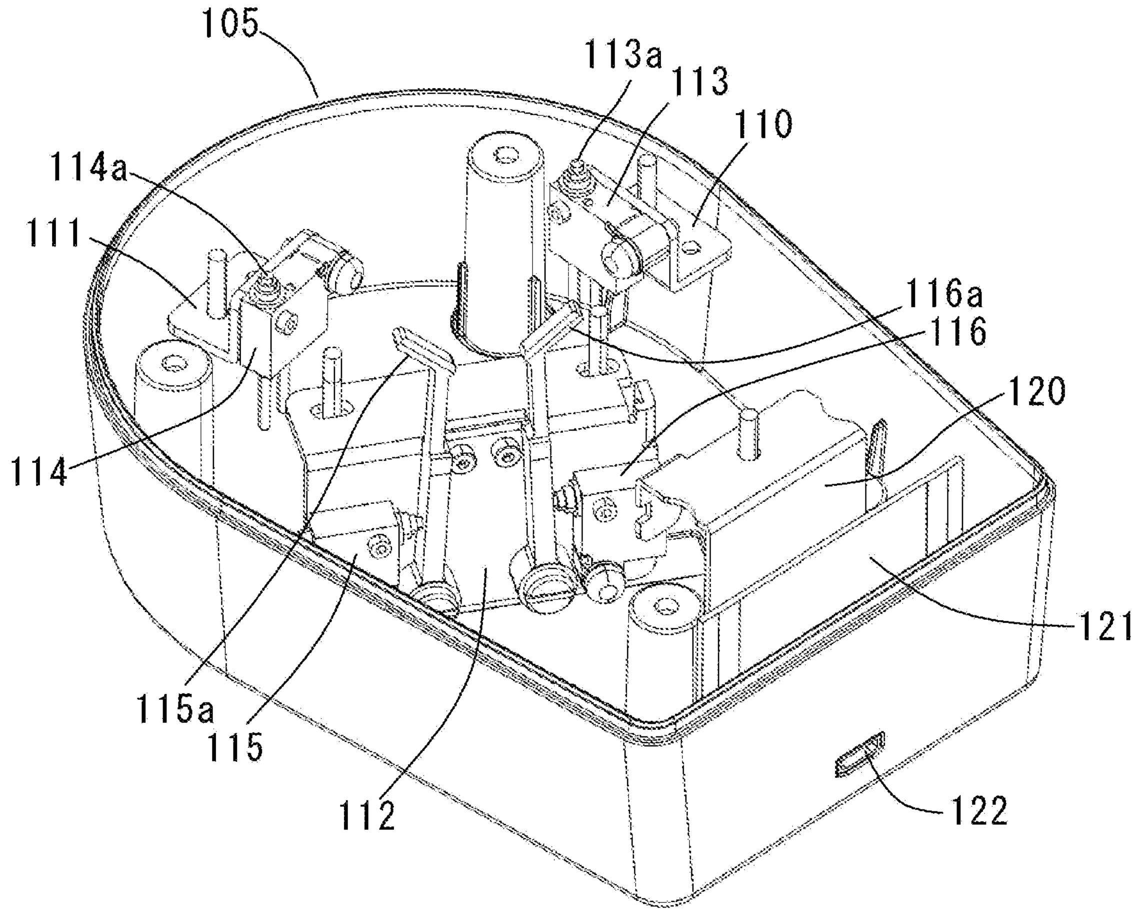
FIG. 19 is an internal perspective view of a base part of a device body.
Figure 20:
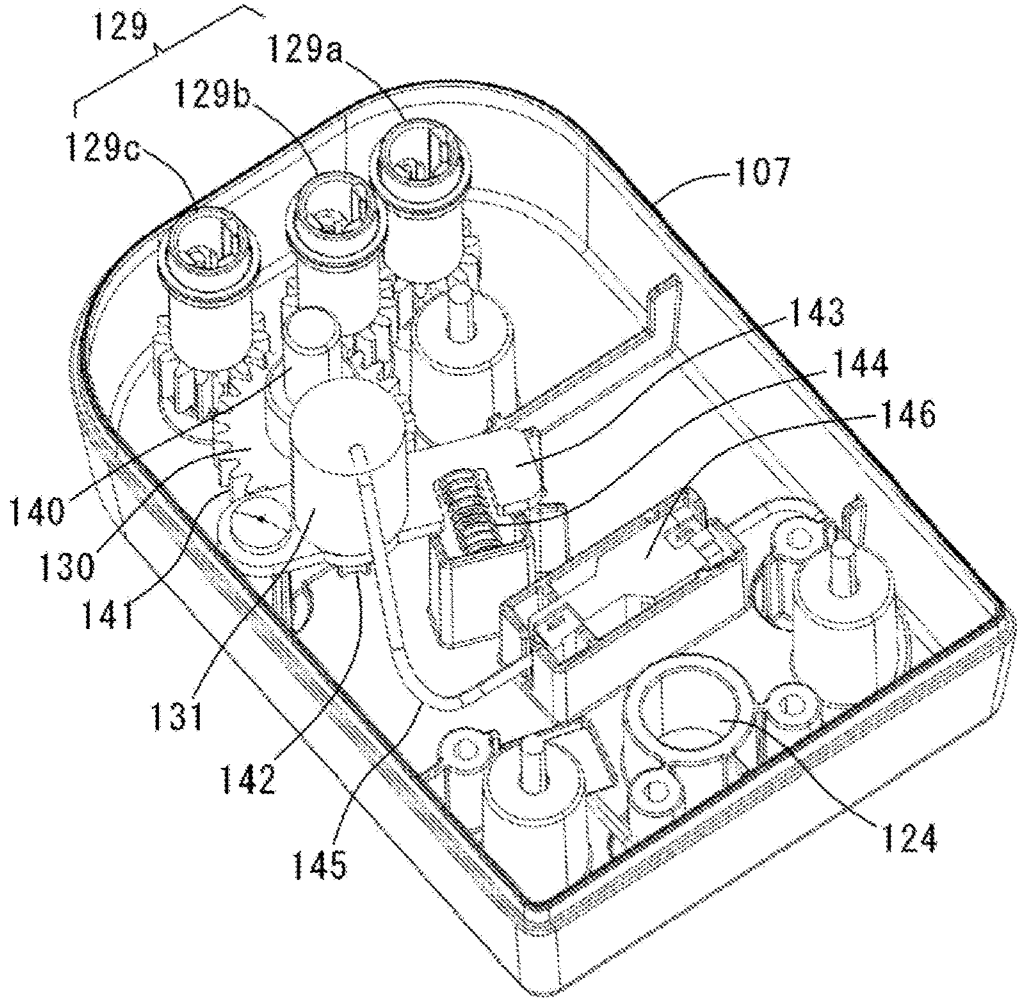
FIG. 20 is an internal perspective view of a guide part of the device body.
Figure 34:
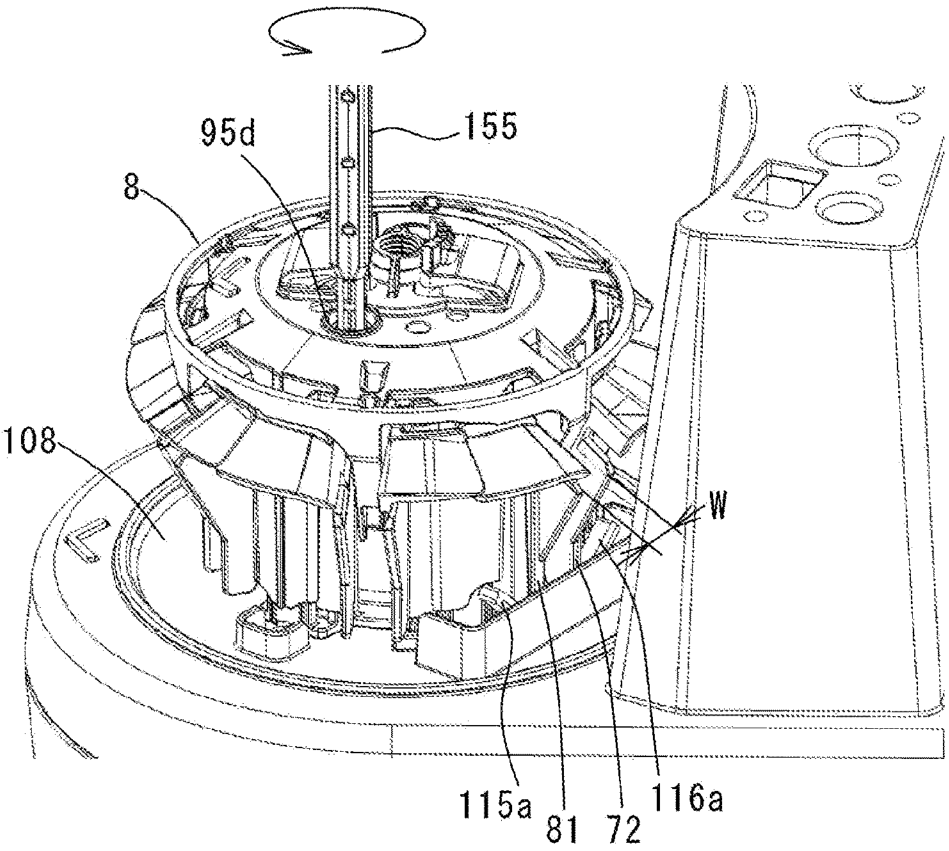
FIG. 34 is a perspective view showing a situation during width adjustment.
Figure 35:
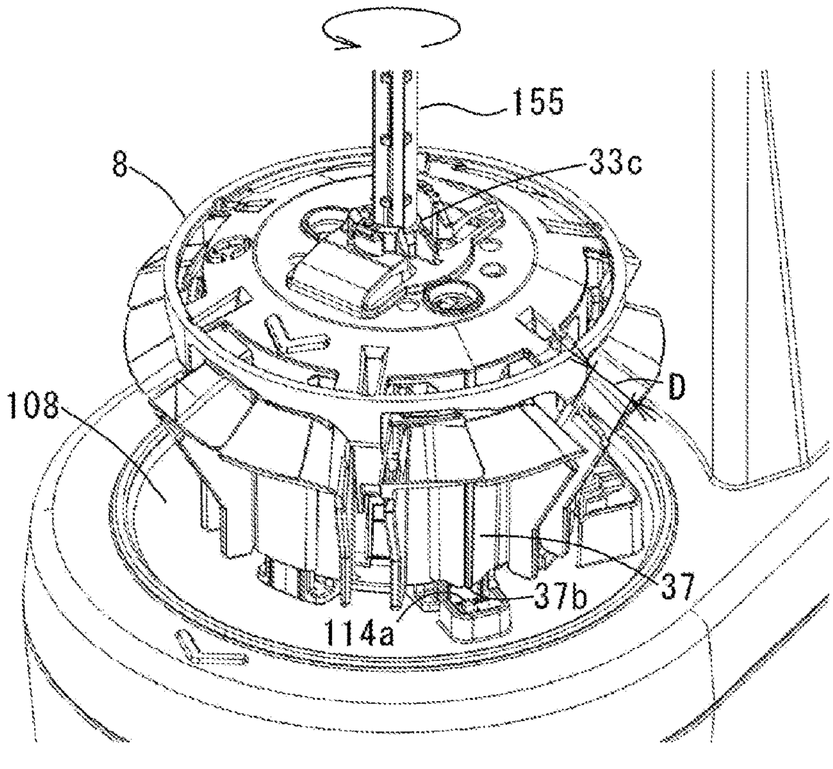
FIG. 35 is a perspective view showing a situation during depth adjustment.
Figure 36:
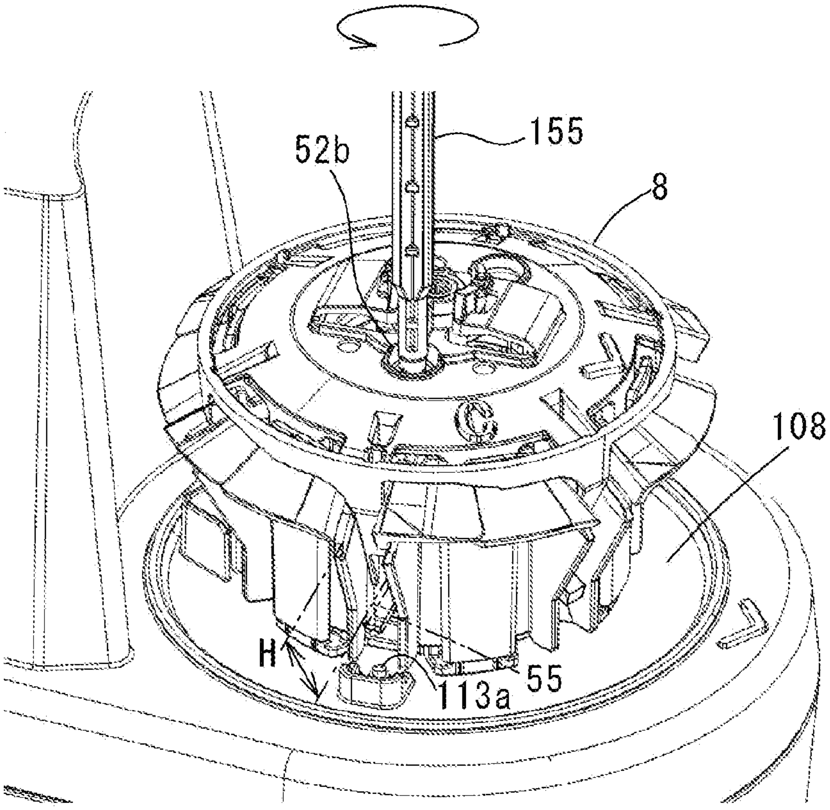
FIG. 36 is a perspective view showing a situation during height adjustment.

As shown in FIG. 19, on a rear surface of the rotor table 108, a height zero point detection sensor 113, a depth zero point detection sensor 114 and a width zero point detection sensor 115 and 116 are mounted via brackets 110, 111 and 112 are provided respectively. Each of the sensors 113, 114, 115 and 116 consists of a limit switch and as shown in FIGS. 34, 35 and 36, detection portions 113*a*, 114*a*, 115*a* and 116*a* of the sensors 113, 114, 115 and 116 protrude upward from the rotor table 108. As shown in FIG. 36, the detection portion 113*a* of the height zero point detection sensor 113 faces the lower surface of the tablet support table 55 of the rotor 8 placed on the rotor table 108 and is capable of coming into contact therewith. Further, as shown in FIG. 35, the detection portion 114*a* of the depth zero point detection sensor 114 faces the projection 37*b* of the guide portion 37 and is capable of coming into contact therewith. Further, as shown in FIG. 34, the detection portions 115*a* and 116*a* of the width zero point detection sensors 115 and 116 face the lower end of the first vertical projecting piece 72 and the lower end of the second vertical projecting piece 81, respectively and can come into contact with each other. Returning to FIG. 17, the detectors 113*a*, 114*a*, 115*a* and 116*a* are prevented from coming into contact with foreign matter by U-shaped guard portions 117, 118 and 119 provided on the rotor table 108.

Further, as shown in FIG. 19, a substrate 121 is attached to the rear surface of the rotor table 108 via the bracket 120. The substrate 121 receives signals from the height zero point detection sensor 113, the depth zero point detection sensor 114, the width zero point detection sensors 115 and 116 and an encoder 131, which will be described later, and transmits the signals to the control device 200, which will be described later. power them. The base portion 105 is provided with a USB terminal 122 for connecting the substrate 121 and the control device 200.

Figure 18:
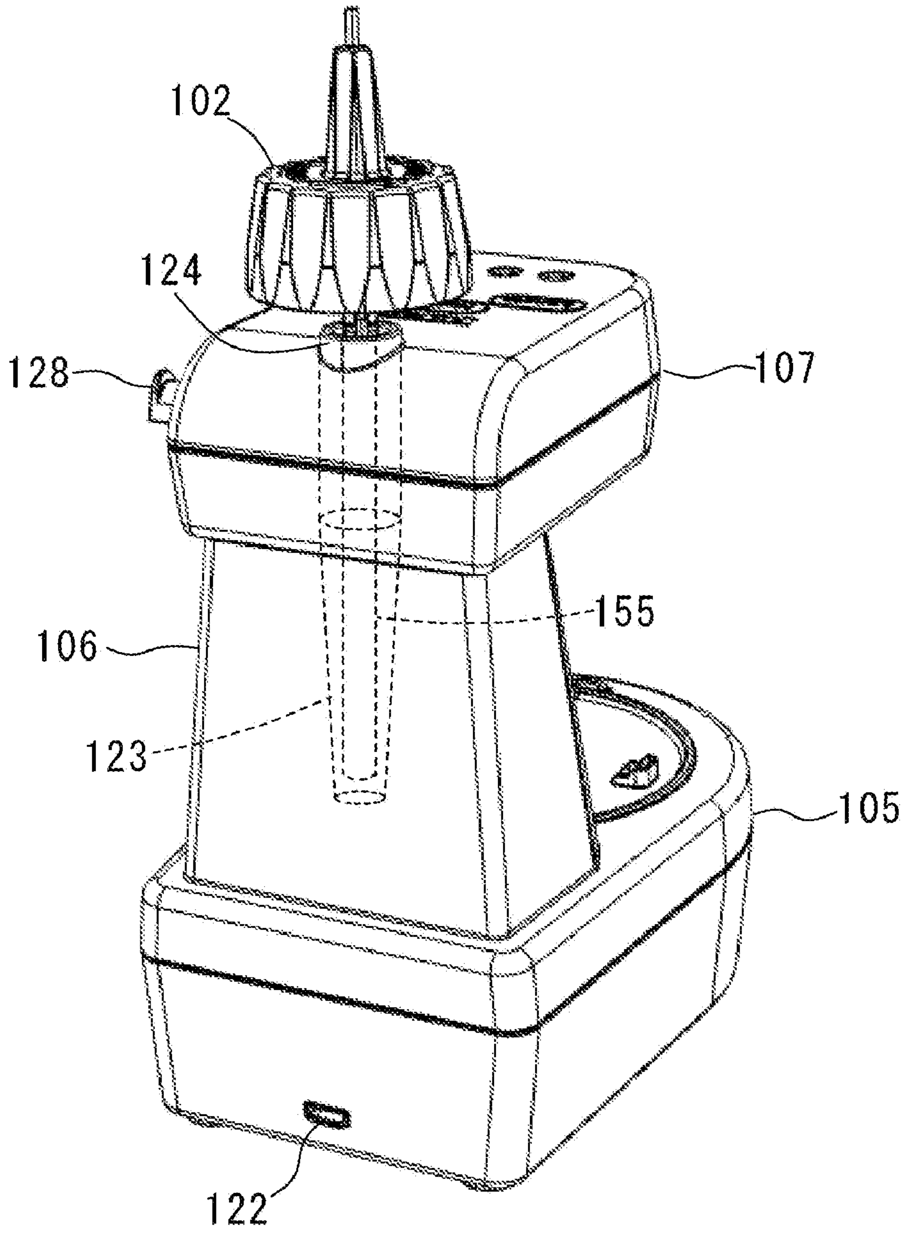
FIG. 18 is a perspective view of the tablet guide path adjusting device as seen obliquely from a rear side.

Inside the intermediate portion 106, as shown in FIG. 18, a cylindrical portion 123 in which a central shaft 155 of the adjusting member 102 is accommodated is provided. The cylindrical portion 123 communicates with an accommodating opening 124 of the guide portion 107, which will be described later, and extends vertically, and has a diameter that decreases downward.

As shown in FIG. 17, the guide portion 107 is composed of an upper case 107*a* and a lower case 107*b*. The accommodating opening 124 is formed in the rear portion of the guide portion 107 so as to penetrate from an upper case 107*a* to a lower case 107*b* and into which the central shaft 155 is inserted when the adjusting member 102 is accommodated. Three upper guide holes 125*a*, 125*b* and 125*c* into which the central shaft 155 is inserted when the adjusting member 102 is used are formed in a front part of the upper case 107*a* of the guide part 107, and in the lower case 107*b*, lower guide holes (indicated by reference numeral 126 in FIG. 22(*b*)) are formed at positions corresponding to the upper guide holes 125*a*, 125*b* and 125*c*. Indications 127*a*, 127*b* and 127*c* are provided near the upper guide holes 125*a*, 125*b* and 125*c* to indicate what the guide holes are for adjustment. A protrusion 128 (see FIG. 18) for attaching the tool 103 is formed on the rear side surface of the guide portion 107. Inside the guide part 107, three rotating members 129 (that is, a first rotating member 129*a*, a second rotating member 129*b* and a third rotating member 129*c*), an intermediate gear 130 and the encoder 131 are provided.

Figure 21:
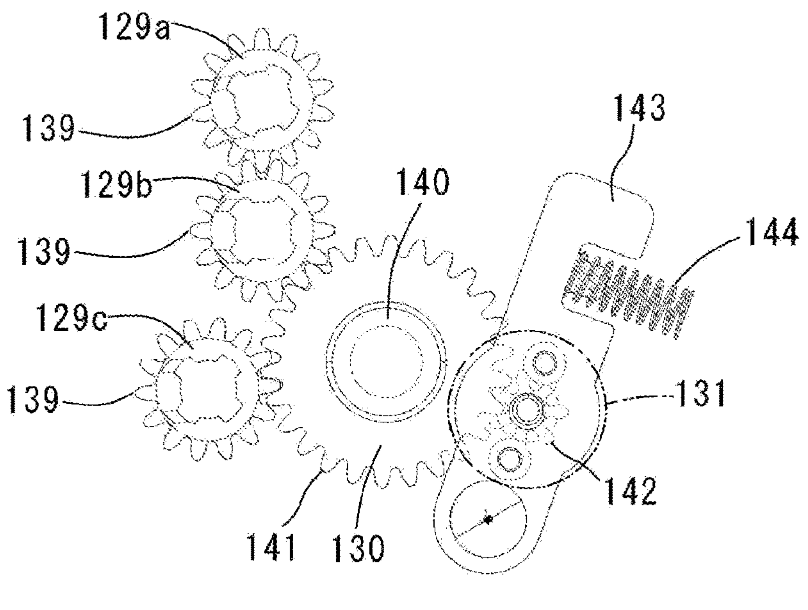
FIG. 21 is a plan view showing a rotation mechanism of a rotating member.
Figure 22:
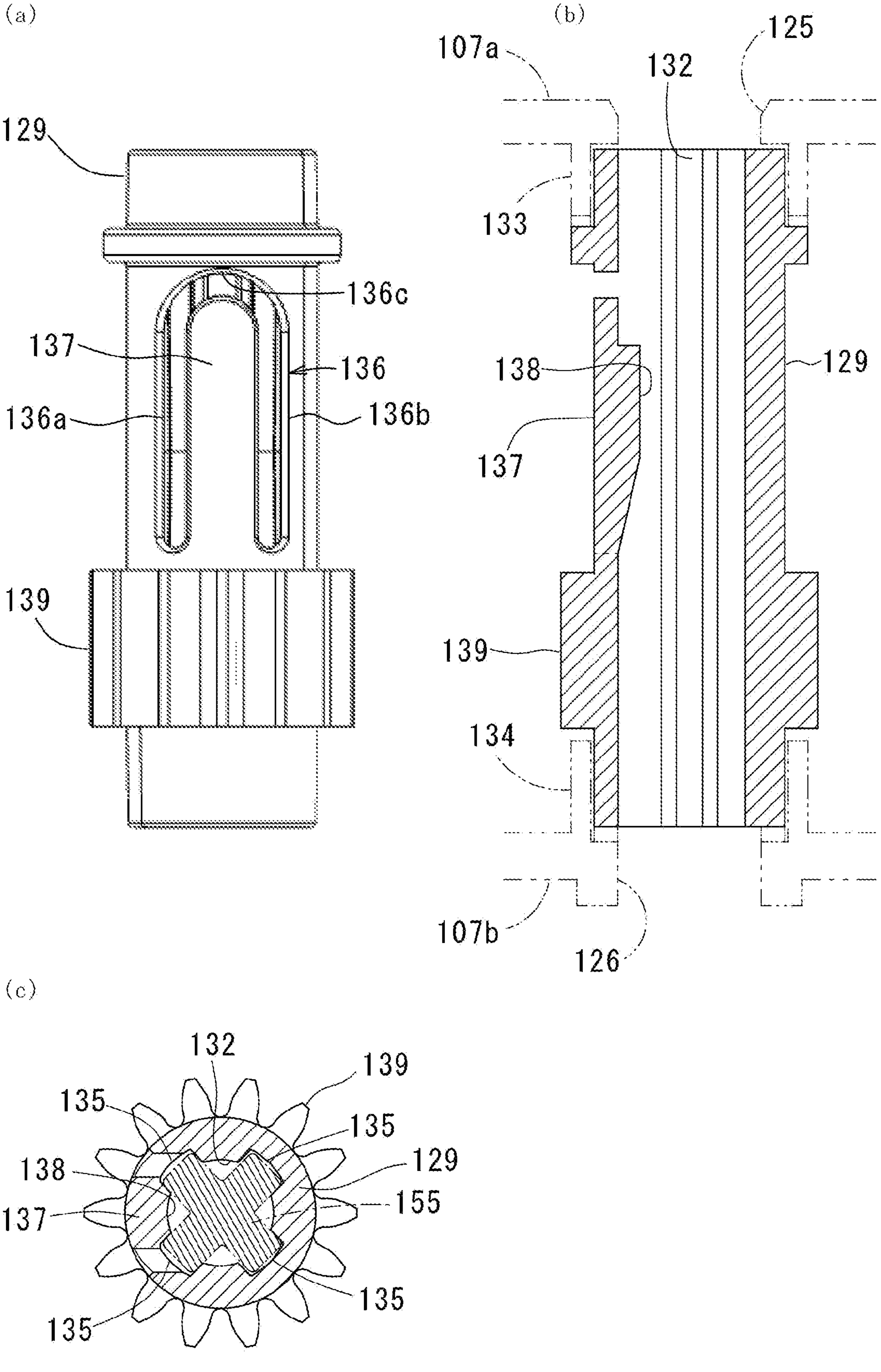
FIG. 22(*a*) is a front view of the rotating member, FIG. 22(*b*) is a vertical sectional view of the rotating member, and FIG. 22(*c*) is a lateral sectional view of the rotating member.

The three rotating members 129 have the same shape. As shown in FIG. 22, the rotating member 129 has a cylindrical shape with an engaging hole 132 that engages with the central shaft 155 of the adjusting member 102, which will be described later. The upper end of the rotating member 129 is rotatably engaged with an annular rib 133 formed around the upper guide hole 125 so that the engaging hole 132 communicates with the upper guide hole 125. Similarly, the lower end of the rotating member 129 is rotatably engaged with an annular rib 134 formed around a lower guide hole 126 so that the engaging hole 132 communicates with the lower guide hole 126. Four axially extending engaging grooves 135 are formed in an inner surface of the engaging hole 132 of the rotating member 129 at regular intervals in the circumferential direction. The rotating member 129 is provided with an elastic piece 137 by forming an inverted U-shaped slit 136 consisting of two axially extending linear portions 136*a* and 136*b* facing two adjacent engaging grooves 135 and an arc portion 136*c* connecting upper ends of the linear portions 136*a* and 136*b*. An inner surface of the elastic piece 137 is formed with a pressing portion 138 that is displaced inward from the inner surface of the engaging hole 132. The pressing portion 138 serves as a backlash prevention portion that prevents backlash between the central shaft 155 of the adjusting member 102 inserted into the engaging hole 132 and the engaging hole 132. A rotating gear 139 is provided below the elastic piece 137 of the rotating member 129. As shown in FIG. 21, the rotating gear 139 of the first rotating member 129*a* meshes with the rotating gear 139 of the second rotating member 129*b* and the rotating gear 139 of the third rotating member 129*c* is separated from the rotating gear 139 of the first rotating member 129*a* and the rotating gear 139 of the second rotating member 129*b*.

The intermediate gear 130 has a shaft portion 140 rotatably supported by the upper case 107*a* and the lower case 107*b*, and a tooth portion 141 fitted to the shaft portion 140 so as to be freely rotatable. The tooth portion 141 has a slight gap with respect to the shaft portion 140 and is movable in a direction perpendicular to the shaft portion 140. The tooth portion 141 of the intermediate gear 130 meshes with the rotating gear 139 of the second rotating member 129*b* and the rotating gear 139 of the third rotating member 129*c*.

The encoder 131 is an operation amount detection part of the present invention and has a detection gear 142 that meshes with the intermediate gear 130. The encoder 131 is attached to a lever 143 rotatably provided on the lower case 107*b*. The lever 143 is biased by a coil spring 144 in a direction in which the detection gear 142 of the encoder 131 meshes with the intermediate gear 130. The lever 143 and the coil spring 144 serve as a backlash prevention portion that prevents backlash between the tooth portion 141 of the intermediate gear 130 and the detection gear 142 and between the tooth portion 141 of the intermediate gear 130 and the rotating gears 139 of the second rotating member 129*b* and the third rotating member 120*c*. The tooth portion 141 of the intermediate gear 130 is pushed by the detection gear 142 to maintain engagement with the detection gear 142 and move in a direction orthogonal to the shaft portion 140. As a result, the backlash between the gears is prevented by meshing with the rotating gears 139 of the second rotating member 129*b* and the third rotating member 120*c* without rattling.

When the central shaft 155 of the adjusting member 102 is inserted into the engaging hole 132 of the first rotating member 129*a*, the encoder 131 detects the amount of rotation of the central shaft 155 of the adjusting member 102 via the rotating gear 139 of the first rotating member 129*a*, the rotating gear 139 of the second rotating member 129*b*, the intermediate gear 130 and the detection gear 142. When the central shaft 155 of the adjusting member 102 is inserted into the engaging hole 132 of the second rotating member 129*b*, the encoder 131 detects the amount of rotation of the central shaft 155 of the adjusting member 102 via the rotating gear 139 of the second rotating member 129*b*, the intermediate gear 130 and the detection gear 142. When the central shaft 155 of the adjusting member 102 is inserted into the engaging hole 132 of the third rotating member 129*c*, the encoder 131 detects the amount of rotation of the central shaft 155 of the adjusting member 102 via the rotating gear 139 of the third rotating member 129*c*, the intermediate gear 130 and the detection gear 142. The amount of rotation of the adjusting member 102 detected by the encoder 131 is transmitted to the substrate 121 of the base portion 105 via a cord 145 and a connector 146.

Figure 23:
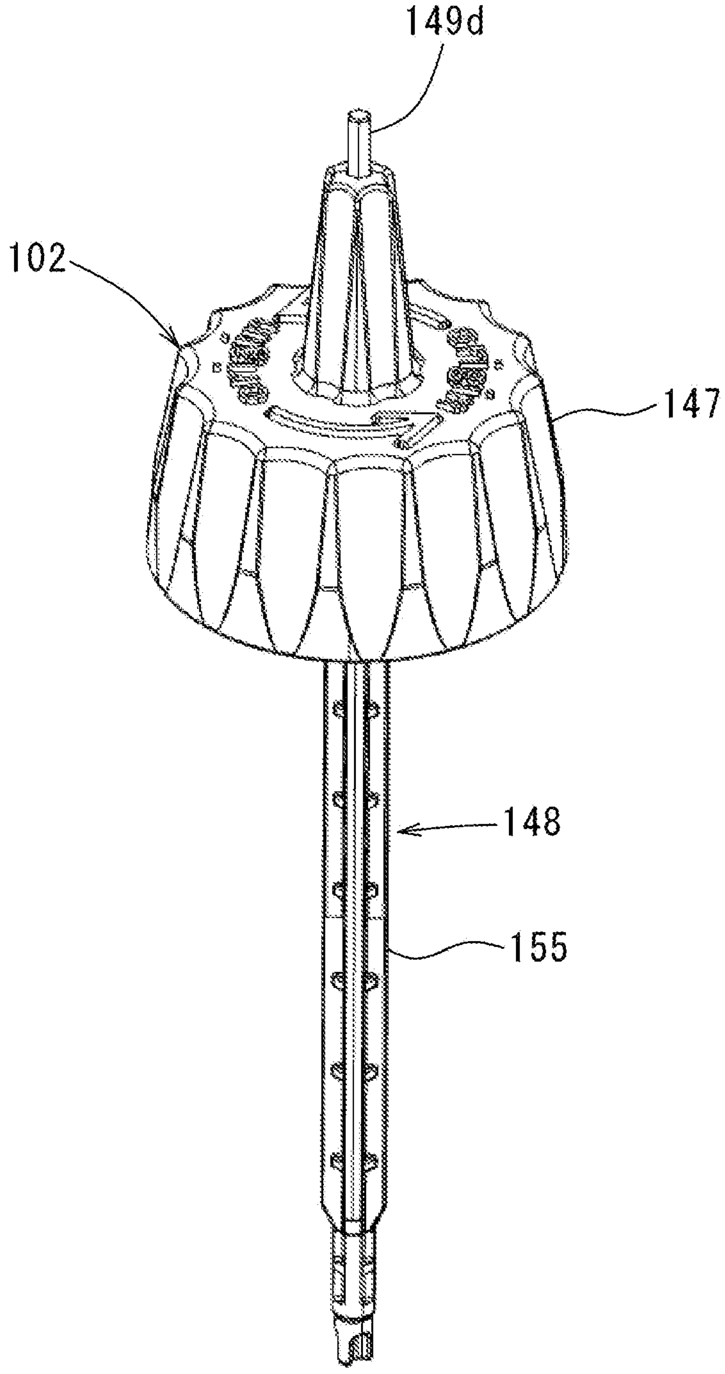
FIG. 23 is a perspective view of an adjusting member.

The adjusting member 102, as shown in FIG. 23, is roughly divided into a grip portion 147 and a shaft portion 148.

Figure 24:
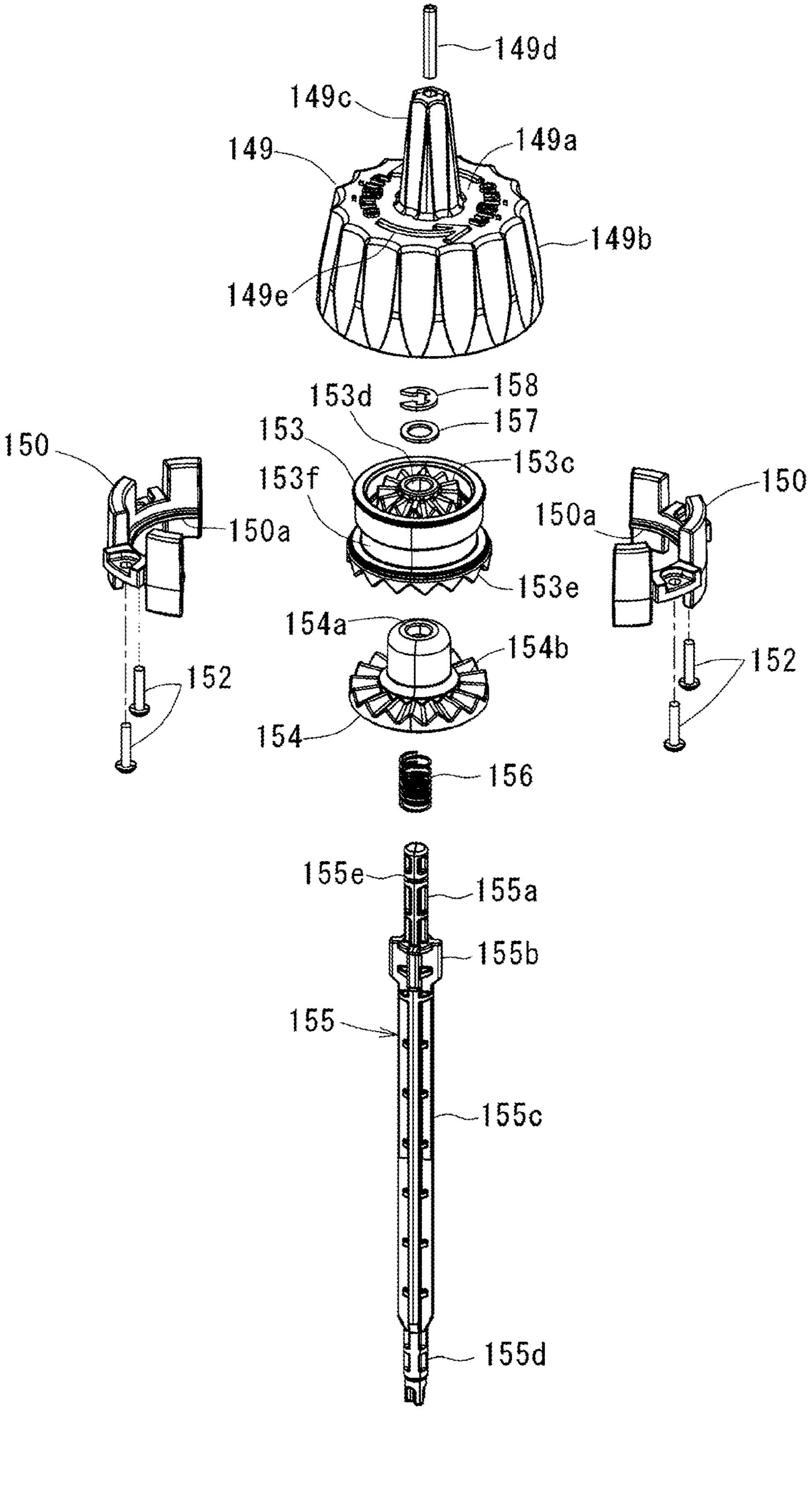
FIG. 24 is an exploded perspective view of the adjusting member.

The grip portion 147 is composed of an outer member 149 and an inner member 150 as shown in FIG. 24.

Figure 25:
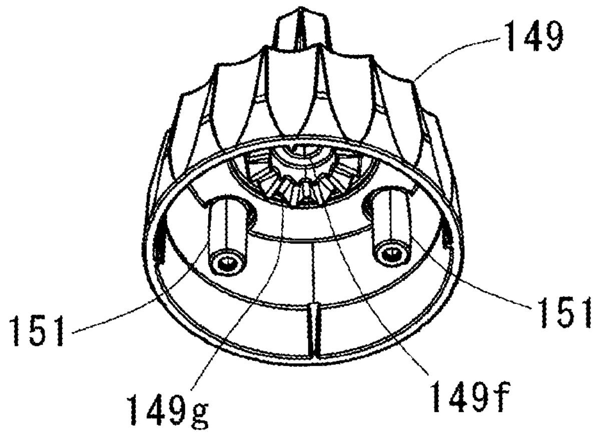
FIG. 25 is a bottom perspective view of an outer member of a grip part.

The outer member 149 has a large knob portion 149*b* having a truncated cone shape with an upper end closed by a ceiling wall 149*a* and an open lower end and a small knob portion 149*c* protruding axially from the top wall 149*a*. A hexagonal wrench 149*d* is attached to the upper end of the small knob portion 149*c*. The hexagonal wrench 149*d* is for engaging with a hexagonal hole (not shown) provided in the adjusting member 24 of the partition adjusting mechanism M1 of the tablet cassette 2 to drive the partition adjusting mechanism M1. An arrow mark 149*e* indicating the origin direction is provided on the surface of the ceiling wall 149*a* of the large knob portion 149*b*. As shown in FIG. 25, a shaft hole 149*f* and an engaging portion 149*g* consisting of irregularities arranged annularly around the shaft are formed on the rear surface of the ceiling wall 149*a* of the large knob portion 149*b*.

As shown in FIG. 24, the inner member 150 is formed in a half-cylindrical shape and is attached to a mounting seat 151 shown in FIG. 25 inside the outer member 149 with mounting screws 152. A flange 150*a* is formed on the inner circumference of the inner member 150 so as to protrude radially inward.

The shaft portion 148 is composed of a first member 153, a second member 154 and a central shaft 155.

Figure 26:
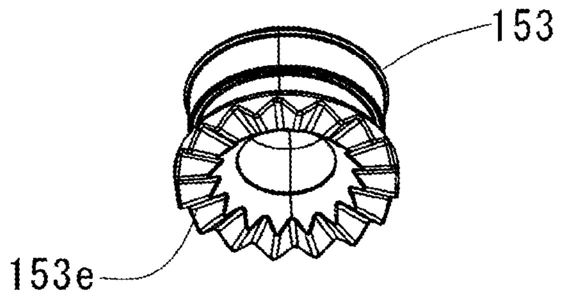
FIG. 26 is a perspective view of a first member of a shaft part viewed from below.
Figure 28:
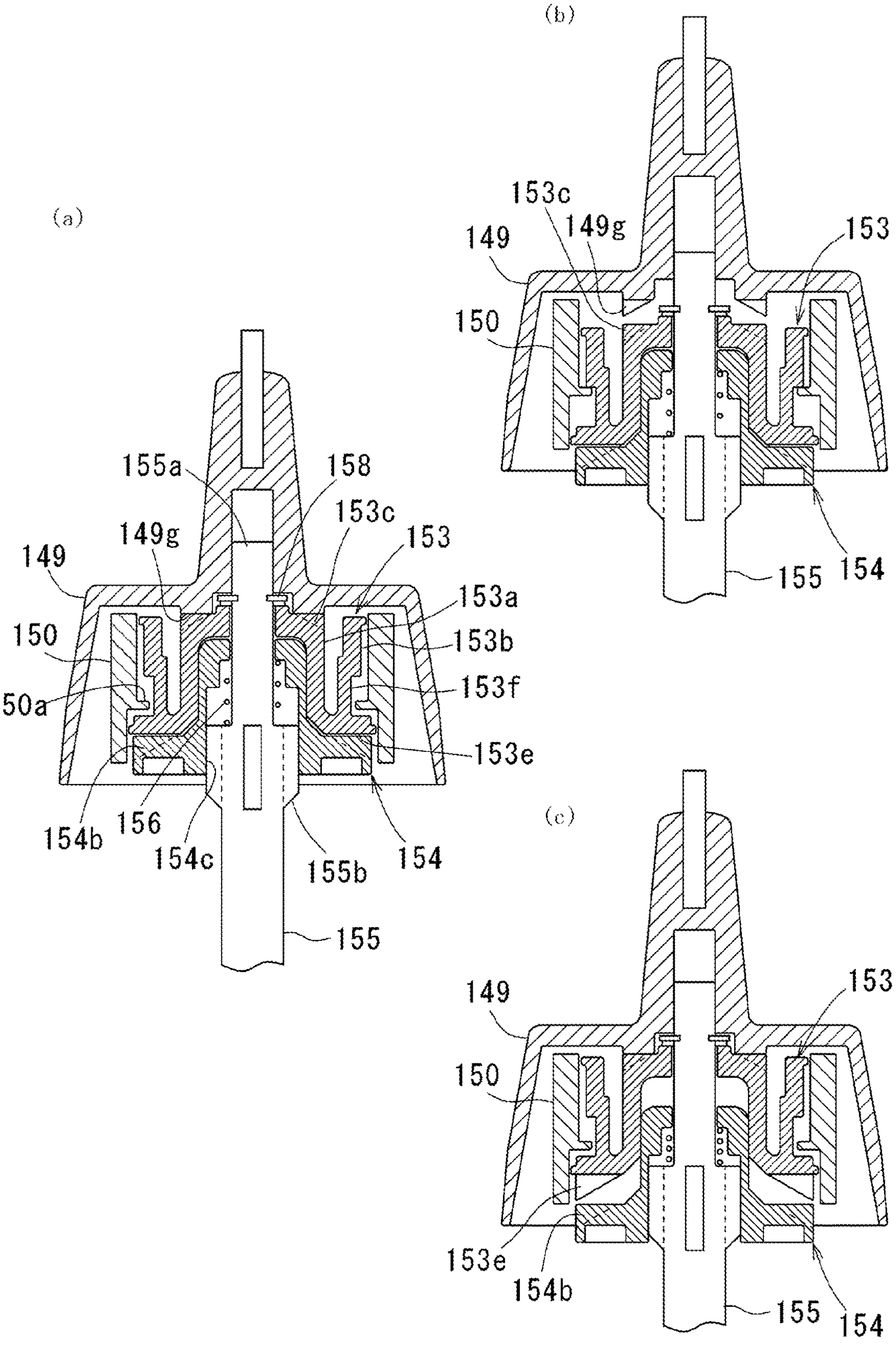
FIG. 28(*a*) is a cross-sectional view of the adjusting member, FIG. 28(*b*) is a cross-sectional view when the grip part is raised, and FIG. 28(*c*) is a cross-sectional view when a torque limiter is activated.

The first member 153 is sized to be accommodated inside the inner member 150 of the grip portion 147 and has an inner cylindrical portion 153*a* and an outer cylindrical portion 153*b* as shown in FIG. 28. An upper end of the inner cylindrical portion 153*a* is closed by an upper engaging portion 153*c* and a lower end thereof is open. A shaft hole 153*d* is formed in a center of the upper engaging portion 153*c* and concave and convex portions are formed on the upper surface thereof so as to be annularly arranged around the axis. The upper engaging portion 153*c* of the inner cylindrical portion 153*a* can be engaged with the engaging portion 149*g* of the grip portion 147. A lower end of the inner cylindrical portion 153*a* is open and has a lower engaging portion 153*e* on the outer periphery. As shown in FIG. 26, the lower surface of the lower engaging portion 153*e* is formed with irregularities arranged in an annular shape around the axis. An upper end of the outer cylindrical portion 153*b* is open and a lower end thereof is connected to an upper surface of the lower engaging portion 153*e*. An outer peripheral concave portion 153*f* into which the flange 150*a* of the inner member 150 of the grip portion 147 enters is formed on the outer periphery of the outer cylindrical portion 153*b*.

Figure 27:
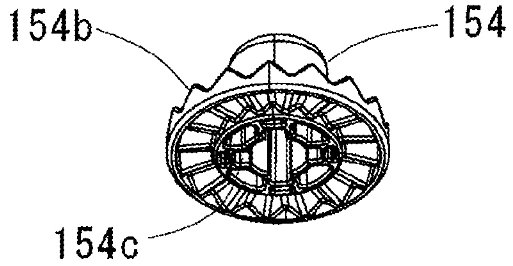
FIG. 27 is a perspective view of a second member of the shaft part viewed from below.

An upper portion of the second member 154 is formed in a cylindrical shape having a size that fits inside the inner cylindrical portion 153*a* of the first member 153. An upper end of the second member 154 is closed and a shaft hole 154*a* is formed in the center. A lower end of the second member 154 is open and an annular engaging portion 154*b* is formed on the outer circumference. An upper surface of the engaging portion 154*b* is formed with irregularities arranged in an annular shape around the axis. The engaging portion 154*b* of the second member 154 can be engaged with the lower engaging portion 153*e* of the first member 153. As shown in FIG. 27, four engaging grooves 154*c* extending in the axial direction are formed on the inner surface of the second member 154 at regular intervals in the circumferential direction.

The central shaft 155 has a base end portion 155*a*, a first engaging portion 155*b*, a second engaging portion 155*c* and a distal end portion 155*d* in this order from top to bottom in FIG. 24. The base end portion 155*a* is formed in a cylindrical shape to fit into the shaft hole 154*a* of the second member 154, the shaft hole 153*d* of the first member 153, and the shaft hole 149*f* of the outer member 149 of the grip portion 147. An outer peripheral groove 155*e* is formed on the outer peripheral surface of the base end portion 155*a*, with which a retaining ring 158, which will be described later, is engaged. The first engaging portion 155*b* has a cross-shaped cross section and can be engaged with the engaging groove 154*c* of the second member 154. The second engaging portion 155*c* has a cross-shaped cross section smaller than that of the first engaging portion 155*b* and is capable of engaging with an engaging groove 135 of the engaging hole 132 of the rotating member 129 of the guide portion 107. The distal end portion 155*d* is cylindrical and its distal end can be engaged with the engaging portions 33*c*, 52*b* and 95*d* of the adjusting members 33, 52 and 64 of the tablet cassette 2, respectively.

The central shaft 155 is retained by attaching a coil spring 156 to the base end portion 155*a*, penetrating the base end portion 155*a* into the shaft hole 154*a* of the second member 154 and the shaft hole 153*d* of the first member 153 and attaching the retaining ring 158 via a washer 157 to the outer peripheral groove 155*e* of the base end portion 155*a* projecting from the first member 153. The coil spring 156 is mounted between the first engaging portion 155*b* and the second member 154 in a compressed state. As a result, the first engaging portion 155*b* of the central shaft 155 engages the engaging groove 154*c* of the second member 154 and the second member 154 is biased toward the first member 153 by the coil spring 156. As a result, the engaging portion 154*b* of the second member 154 engages with the upper engaging portion 153*c* of the first member 153 so that the first member 153 and the second member 154 can rotate together.

The grip portion 147 is attached to the shaft portion 148 by fixing it to the mounting seat 151 of the outer member 149 with an attachment screw 152 in a state in which the half-split inner member 150 is assembled to the first member 153 of the shaft portion 148 so that the flange 150*a* of the inner member 150 fits into the outer peripheral concave portion 153*f* of the first member 153 of the shaft portion 148. Thereby, the grip portion 147 is axially slidable with respect to the shaft portion 148 and is movable between an engaged position where the engaging portion 149*g* engages with the upper engaging portion 153*c* of the first member 153 and engages with the central shaft 155 of the shaft portion 148 so as to be capable of rotating integrally and a non-engaged position where the engaging portion 149*g* is separated from the upper engaging portion 153*c* of the first member 153 and idles with respect to the central shaft 155.

Figure 29:
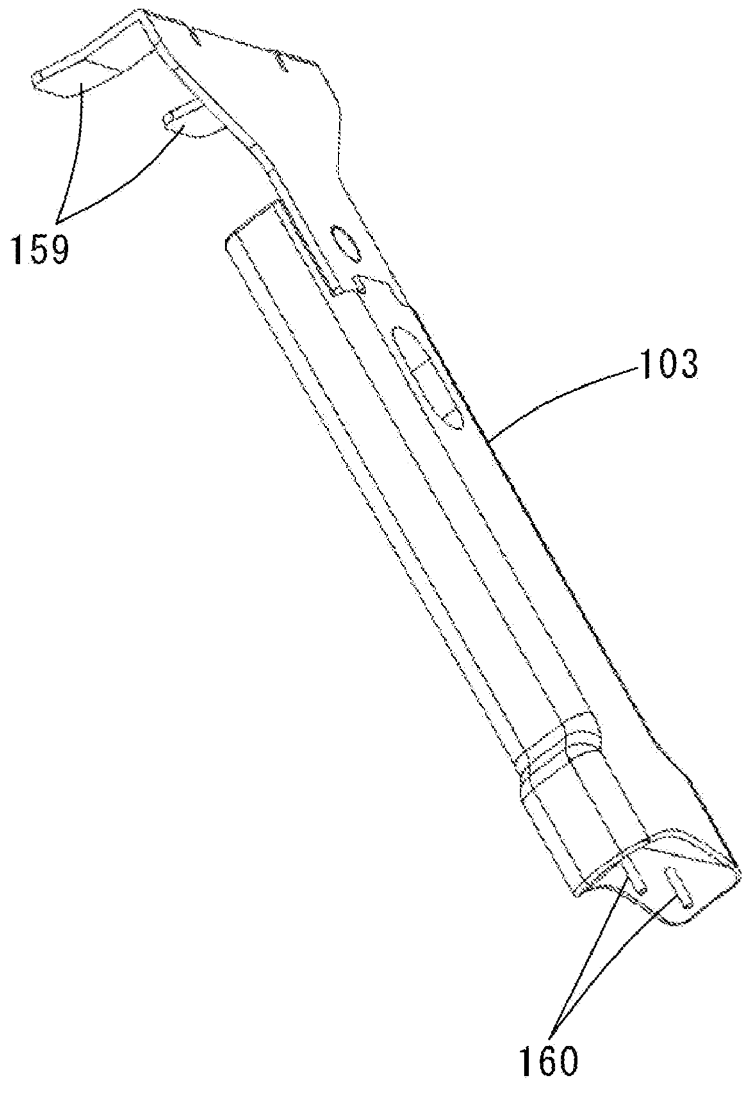
FIG. 29 is a perspective view of a tool.

The tool 103 has a metal fitting 159 for removing a lifting unit from the cassette body 5 when the lifting unit (not shown) is attached to lift the tablet cassette 2 and a pin 160 for removing the rotor cover 30 as shown in FIG. 29.

Figure 30:
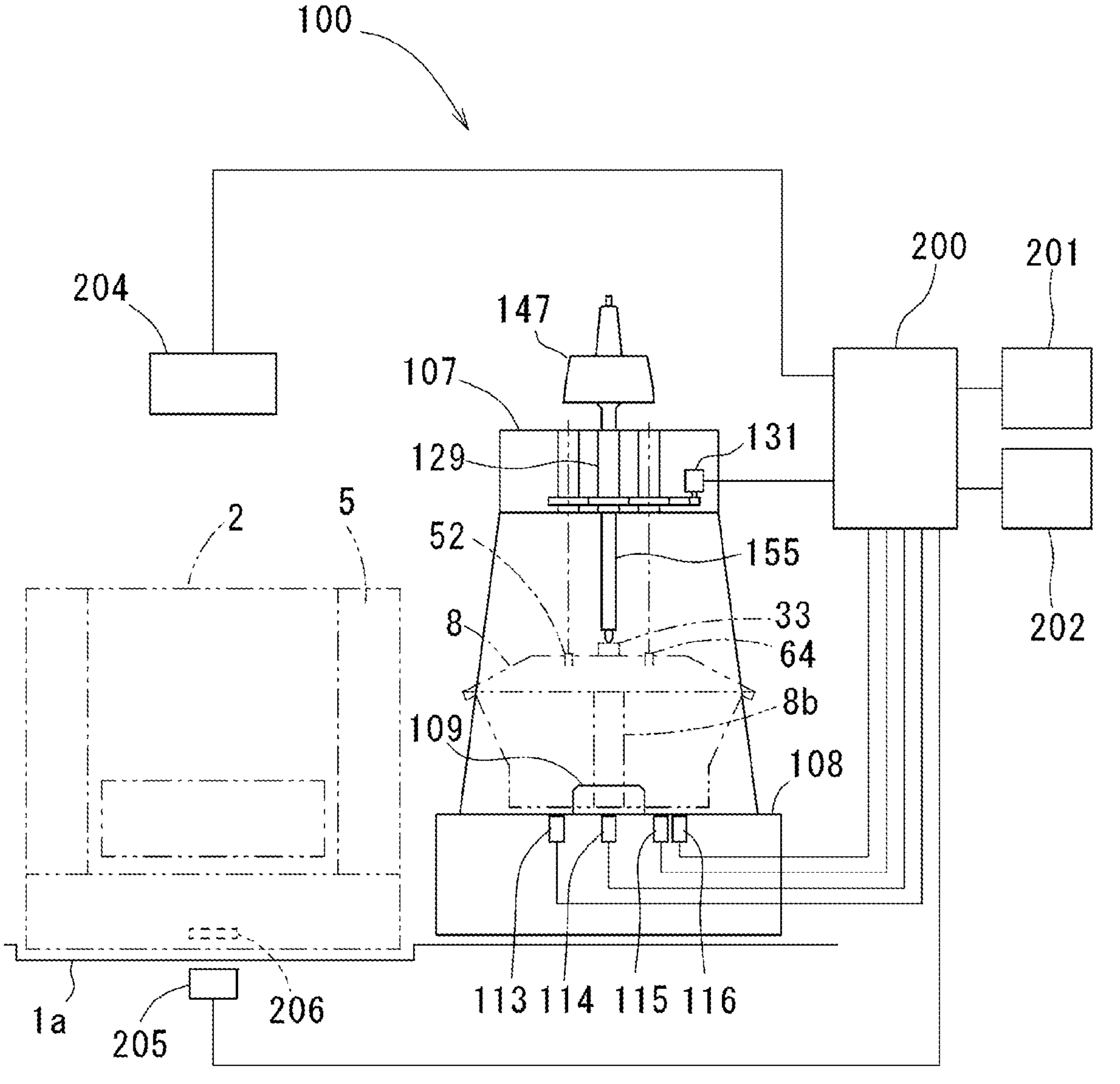
FIG. 30 is a system configuration diagram of the tablet guide path adjusting device.

FIG. 30 is a system configuration diagram of the tablet guide path adjusting device 100. The tablet guide path adjustment device 100 includes the control device 200, a display device 201 and a tablet master 202. Detection signals of the height, depth and width zero point detection sensors 113, 114, 115 and 116 are input to the control device 200. The detection signal from the encoder 131 is also input to the control device 200. The tablet master 202 is the tablet master storage part of the present invention and stores an identification ID of the type of tablet, the depth, height and width dimensions of the tablet guide path 8*b* suitable for the shape or size of the tablet, and the shape or size of the tablet. Instead of the dimensions of the tablet guide path 8*b*, numerical values related to the dimensions, such as correction coefficients for standard dimensions, may be stored. The control device 200 displays target values and current values of the depth, height and width on the display device 201 based on the detection signals from the tablet master 202 and the sensors 113, 114, 115 and 116. A read signal of a barcode reader 204 provided in the tablet storing and dispensing device 1 shown in FIG. 1 and a read signal of a RFID chip 206 of the tablet cassette 2 by a RFID reader 205 provided on a filling table 1*a* of the tablet storage and extraction device 1 shown in FIG. 1 are input to the control device 200. The depth, height and width target values may be downloaded from a host computer or a database on the Internet.

Figure 31:
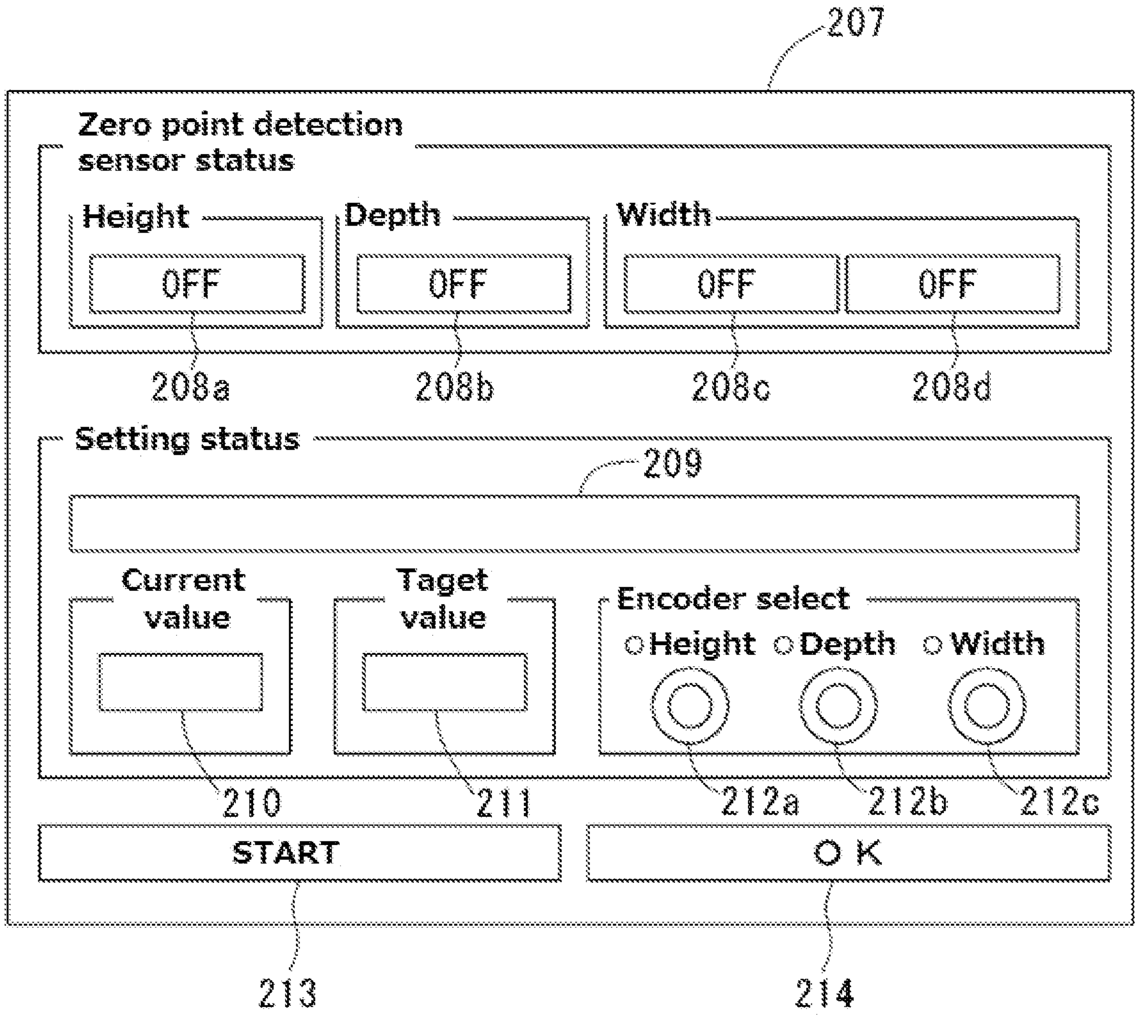
FIG. 31 is a diagram showing an example of a screen of a display device.

FIG. 31 shows an example of a screen 207 displayed on the display device 201. The screen 207 is provided with display portions 208*a*, 208*b*, 208*c* and 208*d* that indicate ON/OFF states of the zero point detection sensors for height, depth and width, a message portion 209 that displays an action to prompt the user, display portions 210, 211 for current and target values, and display portions 212*a*, 212*b* and 212*c* for indicating what adjustment the amount of rotation detected by the encoder 131 is for. A start button 213 and an OK button 214 are also displayed. The display device 201 constitutes the notification unit of the present invention. The display device 201 may notify adjustment support information necessary for the user to adjust the tablet guide path 8*b* using the adjusting member 102 such as either the current value or the target value, a difference between the target value and the current value, countdown to target value, a notification of whether the target value has been met, a notification of sounds, printing on paper, switching a light emission state of a LED and reading aloud.

Figure 32:
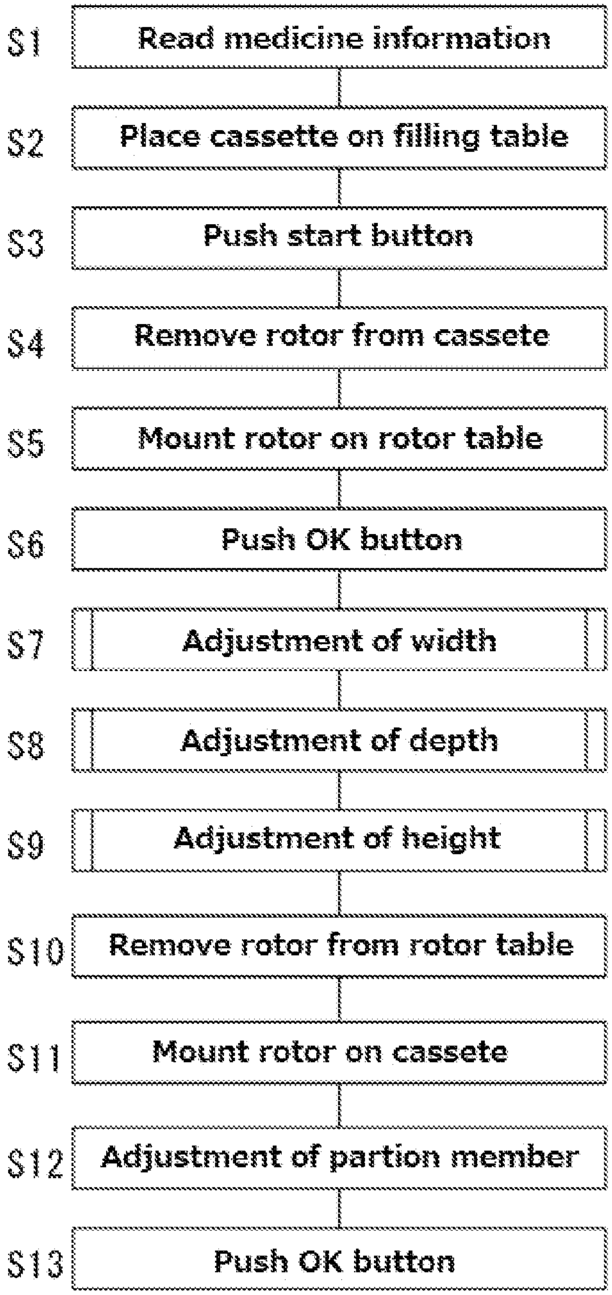
FIG. 32 is a flowchart showing an operation of adjusting the dimensions of the tablet guide path and the entry position of the partition member using the tablet guide path adjusting device.

The operation of adjusting the dimensions of the tablet guide path 8*b* of the rotor 8 of the tablet cassette 2 and the entry position of the partition member 20 using the tablet guide path adjusting device 100 having the above configuration will be described with reference to FIGS. 32 and 33.

First, the tablet guide path adjusting device 100 and the tablet storing and dispensing device 1 are connected with a USB cable (not shown), and an application installed in the control device 200 is activated.

In step 1, medicine information of the tablet to be newly stored in the tablet storing and dispensing device 1 is read into the control device 200 by reading a barcode or the like of a box of the tablet with the barcode reader 204.

In step 2, the tablet cassette 2 to be replaced with new tablets is taken out from the tablet storing and dispensing device 1 and placed on the filling table 1*a*.

In step 3, the user presses the start button 213.

In step 4, the rotor 8 is removed from the cassette body 5. For this purpose, the adjusting member 24 of the partition adjusting mechanism M1 is first rotated using the hexagonal wrench 149*d* of the adjusting member 102 to retract the partition member 20, and then the rotor 8 is removed from the cassette body 5. Next, the rotor cover 30 is removed from the rotor 8 using the tool 103 provided in the device body 101 of the tablet guide path adjusting device 100.

In step 5, the rotor 8 is mounted on the rotor table 108 of the device body 101. At this time, as shown in FIG. 34, the marks provided on the rotor 8 are aligned with the positioning marks on the rotor base 108.

After mounting the rotor 8, the user presses the OK button 214 in step 6 and adjusts the width of the tablet guide path 8*b* in step 7.

Figure 33:
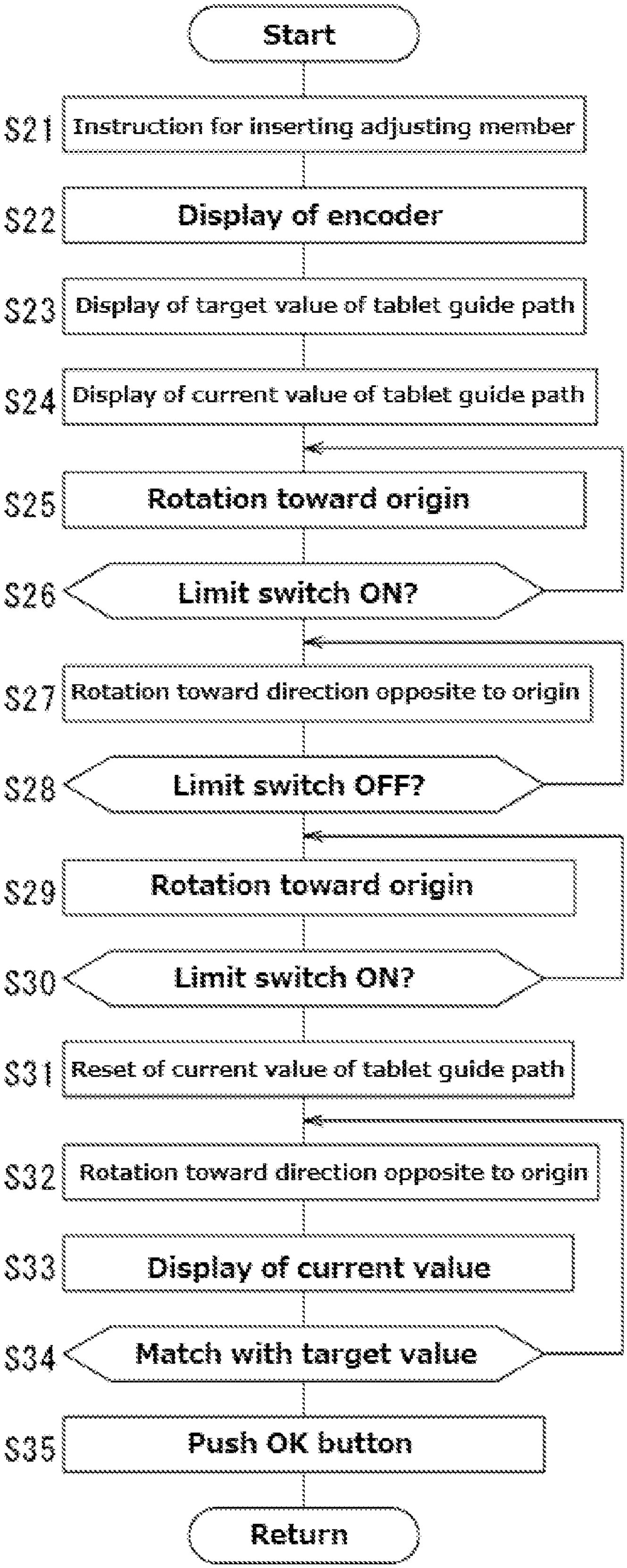
FIG. 33 is a flowchart showing an operation of adjustment steps of a width, a depth and a height of FIG. 32

As shown in FIG. 33, the display device 201 displays "Please insert the adjusting member into the width" in step 21, and the encoder select width display portion 212*c* is highlighted to indicate whether the encoder 131 detects the width in step 22. In step 23, the display device 201 displays the target width of the tablet guide path 8*b* corresponding to the shape and size of the new tablet. Further, in step 24, the RFID chip 206 provided on the tablet cassette 2 is read by the RFID reader 205 provided on the filling table 1*a*, and the current value of the width of the tablet guide path 8*b* set for the tablets stored in the tablet cassette 2 is displayed.

Therefore, the user first takes out the adjusting member 102 from the accommodating opening 124 of the device body 101. Next, the user inserts the central shaft 155 from the upper guide hole 125 of the "Width" of the device body 101 toward the lower guide hole 126 so that the central shaft 155 engages with the engaging portion 95*d* of the width adjusting mechanism M4 of the rotor 8 as shown in FIG. 34.

The central shaft 155 of the adjusting member 102 engages with the engaging hole 132 of the rotating member 129 so that the central shaft 155 can rotate integrally with the rotating member 129. Further, since the pressing portion 138 of the elastic piece 137 of the rotating member 129 presses against the engaging hole 132, the rattling is prevented and the rotation of the adjusting member 102 can be reliably transmitted to the rotating member 129.

The rotation of rotating member 129 is transmitted to the detection gear 142 of the encoder 131 via the intermediate gear 130, the amount of rotation is detected by the encoder 131, and the amount of rotation is transmitted to the control device 200. Since the detection gear 142 of the encoder 131 is pressed against the intermediate gear 130 by the coil spring 144, the backlash between teeth is prevented and the rotation of rotating member 129 is reliably transmitted. As a result, the encoder 131 enables accurate detection.

When the adjusting member 102 is held by the grip portion 147, the shaft portion 148 moves downward with respect to the grip portion 147 due to its own weight and the outer member 149*g* of the grip portion 147 is disengaged from the upper engaging portion 153*c* of the first member 153 as shown in FIG. 28(*b*). As a result, even if the grip portion 147 is rotated while the central shaft 155 is not engaged with the engaging portion 95*d*, the rotational force is not transmitted to the shaft portion 155, so the encoder does not detect the rotation. When the central shaft 155 is pressed against the engaging portion 95*d*, the central shaft 155 moves relative to the grip portion 147 and the engaging portion 149*g* and the upper engaging portion 153*c* are engaged. As a result, by rotating the grip portion 147, the central shaft 155 is rotated. Further, when the central shaft 155 is forced to rotate beyond the zero point while the central shaft 155 is engaged with the engaging portion 95*d*, torque is applied and the torque limiter is activated. As a result, as shown in FIG. 28C, the lower engaging portion 153*e* of the first member 153 is disengaged from the engaging portion 154*b* of the second member 154 and the rotation of the grip portion 147 is not transmitted to the central shaft 155. As a result, the rotation mechanism such as the rotation member 129, the intermediate gear 130, the encoder 131 and the adjusting mechanism of the rotor 8 are not damaged.

Next, in step 25, while pressing the grip portion 147 downward, the central shaft 155 is rotated in the direction of the origin indicated by the arrow on the grip portion 147 until the zero point detection sensors 115 and 116 are turned on. When the zero point detection sensors 115 and 116 are turned on in step 26, the central shaft 155 is rotated in the direction opposite to the origin direction until the zero point detection sensors 115 and 116 are turned off in step 26. Further, when the zero point detection sensors 115 and 116 are turned off in step 28, the central shaft 155 is rotated in the origin direction until the zero point detection sensors 115 and 116 are turned on in step 29. When the zero point detection sensors 115 and 116 are turned on for the second time in step 30, the current value of the width of the tablet guide path 8*b* is reset in step 31 and the current value of the rotating member 129 is detected by the encoder 131. In step 32, the user rotates the grip portion 147 in the direction opposite to the origin direction until the current value reaches the target value. At this time, it is preferable to hold and turn the large knob portion 149*b*. This is because the amount of rotation of the small knob 149*c* becomes large and may overshoot the target value. While the grip portion 147 is rotated, the current value is displayed on the display 210 in step 33. In step 34, when the current value reaches the target value, the user presses the OK button 214, stops rotating the grip portion 147, and removes the adjusting member 102 from the device body 101.

The adjustment of the width of the tablet guide path 8*b* is thus completed and in step 8, the depth of the tablet guide path 8*b* is adjusted. The user inserts the central shaft 155 of the adjusting member 102 from the upper guide hole 125 of the "Depth" of the device body 101 toward the lower guide hole 126 so that the central shaft 155 engages with the engaging portion 33*c* of the depth adjusting mechanism M2 of the rotor 8 as shown in FIG. 35. Since the depth adjustment is the same as the width adjustment, the explanation is omitted.

After completing the adjustment of the depth of the tablet guide path 8*b*, in step 9, the height of the tablet guide path 8*b* is adjusted. The user inserts the central shaft 155 of the adjusting member 102 from the upper guide hole 125 of the "Length" of the device body 101 toward the lower guide hole 126 so that the central shaft 155 engages with the engaging portion 52*b* of the height adjusting mechanism M3 of the rotor 8 as shown in FIG. 36. Since the depth adjustment is the same as the width adjustment, the explanation is omitted.

After completing the adjustment of the height of the tablet guide path 8*b*, the adjusting member 102 is removed to complete the adjustment operation. In step 10, the rotor 8 is removed from the rotor table 108, and in step 11, the rotor cover 30 is attached to the rotor 8 and the rotor 8 is attached to the tablet cassette 2.

Next, in step 12, the partition member 20 is adjusted. For this purpose, the engaging portion 24 of the partition adjusting mechanism M1 is rotated in the advancing direction by the hexagonal wrench 149*d* of the grip portion 147 of the adjusting member 102 until the partition member 20 comes into contact with the rotor 8 and bends. Subsequently, the engaging portion 24 is rotated in the backward direction, and the rotation is stopped at a position where the partition member 20 is slightly separated from the rotor 8. The drive gear 14 of the tablet cassette 2 is rotated to rotate the rotor 8 and confirm that the partition member 20 does not hit the rotor 8.

Figure 37:
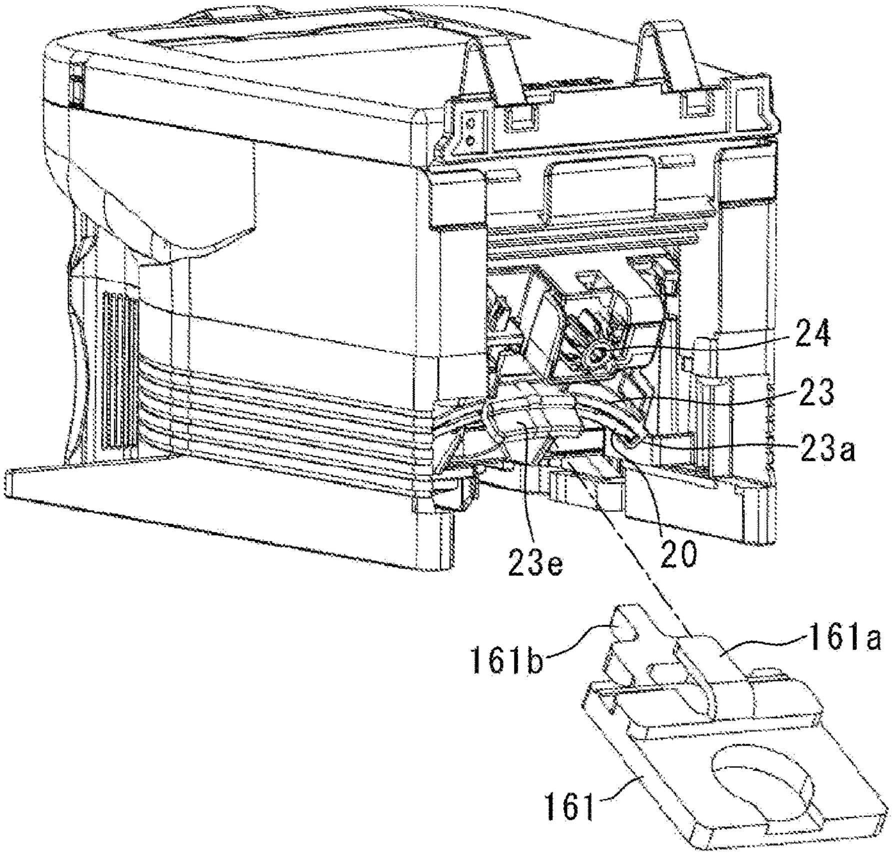
FIGS. 37(*a*) and (*b*) are a perspective view and a cross-sectional view showing how the partition member is adjusted using an adjusting jig, respectively.
Figure 37:
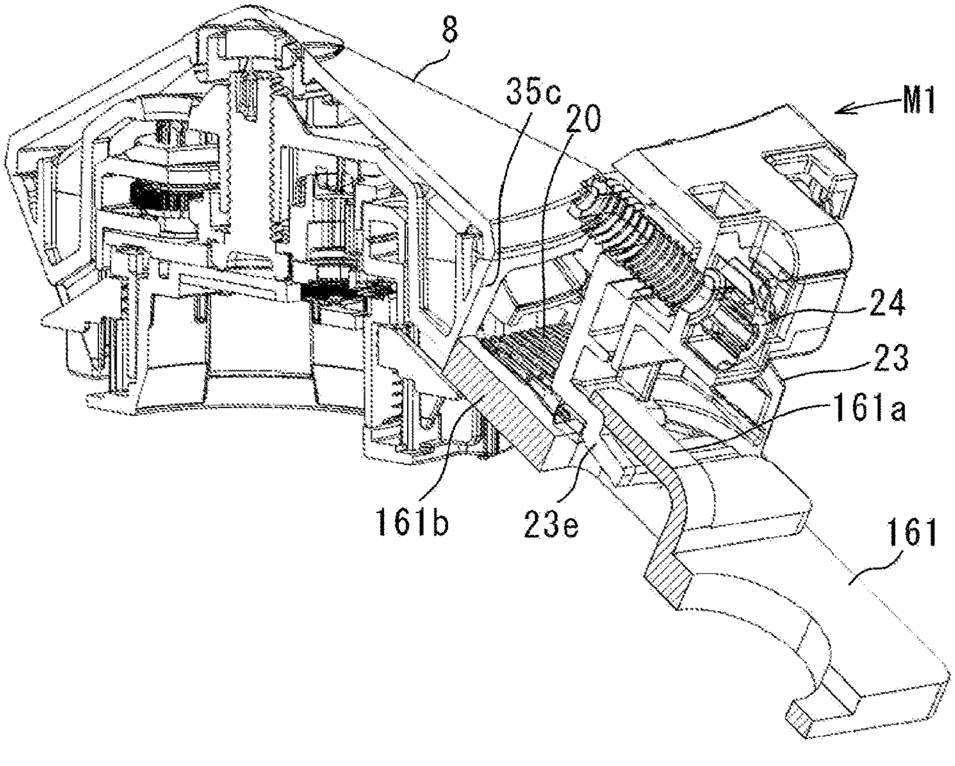

In order to reliably confirm that the partition member 20 is in contact with the lower inclined outer surface 35*c* of the rotor 8, an adjusting jig 161 as shown in FIG. 37 may be used. The adjusting jig 161 has a rectangular plate shape that can be inserted between the two holding portions 23*a* of the movable member 23. A tip of the adjusting jig 161 is provided with an engaging piece 161*a* protruding from an upper surface in an inverted L shape toward the tip and a projecting piece 161*b* protruding from a center of the tip surface toward the tip. The engaging piece 161*a* is formed so as to be hooked on a protrusion 23*e* that protrudes rearward from the center of the lower surface of the movable member 23. The protruding piece 161*b* is formed to protrude to the same position as the tip of the partition member 20 when the engaging piece 161*a* is hooked on the protrusion 23*e* of the movable member 23.

When adjusting the partition member 20, first, the engaging piece 161*a* of the adjusting jig 161 is hooked on the protrusion 23*e* of the movable member 23 to hold the adjusting jig 161 on the movable member 23. In this state, the hexagon wrench 149*d* of the grip portion 147 of the adjusting member 102 is used to rotate the engaging portion 24 of the partition adjusting mechanism M1 in the advancing direction. By this rotation, the adjusting jig 161 approaches the lower inclined surface 35*c* of the rotor 8 together with the movable member 23. When the tip of the projecting piece 161*b* of the adjusting jig 161 contacts the lower inclined surface 35*c* of the rotor 8, the adjustment jig 161 is pushed outward in the radial direction of the rotor 8 by the lower inclined surface 35*c*, the engagement between the adjustment jig 161 and the movable member 23 is released, and the adjustment jig 161 falls. As a result, it can be seen that the partition member 20 has come into contact with the rotor 8, so the rotation by the hexagonal wrench 149*d* is stopped at this point.

When the adjustment of the partition member 20 is completed, the OK button 214 is pushed in step 13 with the tablet cassette 2 placed on the filling table 1*a*, and each adjustment operation is completed. As a result, new tablets are accommodated in the tablet cassette 2 and tablet cassette 2 is mounted at a predetermined position of the tablet storing and dispensing device 1.

As described above, in the tablet guide path adjusting device 100 of the present invention, the manual adjusting member 102 can be engaged with and disengaged from the rotor 8 to be adjusted. Therefore, a plurality of adjustment points (height, depth and width) of the tablet guide groove 8*b* of the rotor 8 can be adjusted with one adjusting member 102. Moreover, since it is not necessary to provide an adjusting member on the rotor 8, the volume of the rotor 8 can be reduced and the capacity of the tablet accommodating portion of the cassette body can be increased. When the rotor is provided with an adjusting member, the capacity of the cassette body is reduced accordingly.

Further, the tablet guide path adjusting device 100 of the present invention can detect the amount of operation (the amount of rotation) of the adjusting member 102 by the detecting device that can be engaged with and disengaged from the adjusting member 102. Therefore, it is not necessary to provide the adjusting member with an electric component such as a sensor for detecting the amount of operation of the adjusting member.

Furthermore, in the tablet guide path adjusting device 100 of the present invention, since the guide holes 125 into which the adjusting member 102 is inserted are provided for each adjustment location (height, depth and width), the adjustment location can be recognized by the guide hole into which the adjusting member is inserted. Therefore, the user does not need to select and input the adjustment points (height, depth and width).

Furthermore, in the tablet guide path adjusting device 100 of the present invention, since the guide hole 125 into which the adjusting member 102 is inserted corresponds to the engaging portion of each adjusting portion of the rotor 8 to be adjusted, the adjustment points (height, depth and width) can be adjusted simply by changing the guide hole into which the adjusting member is inserted without moving the rotor 8.

Since the tablet guide path adjusting device 100 of the present invention displays the adjustment points (height, depth and width) near the guide holes 125 of the device body 101, the relationship between the guide holes and the adjustment points is easy to understand, and there is no mistake of the adjustment points.

In the tablet guide path adjusting device 100 of the present invention, it is preferable that even if other tablets are read by the barcode reader 204 while the barcode reader 204 reads the drug information of the newly stored tablet and adjusts the tablet guide path, the control device 200 refuses this acceptance and does not display it on the screen.

The embodiment described above can be variously modified within the scope of the invention described in the claims.

For example, in the above embodiment, the depth, height and width of the groove of the tablet guide path 8*b* are all adjustable, but any one or two of the depth, height and width of the groove may be adjustable.

Figure 38:
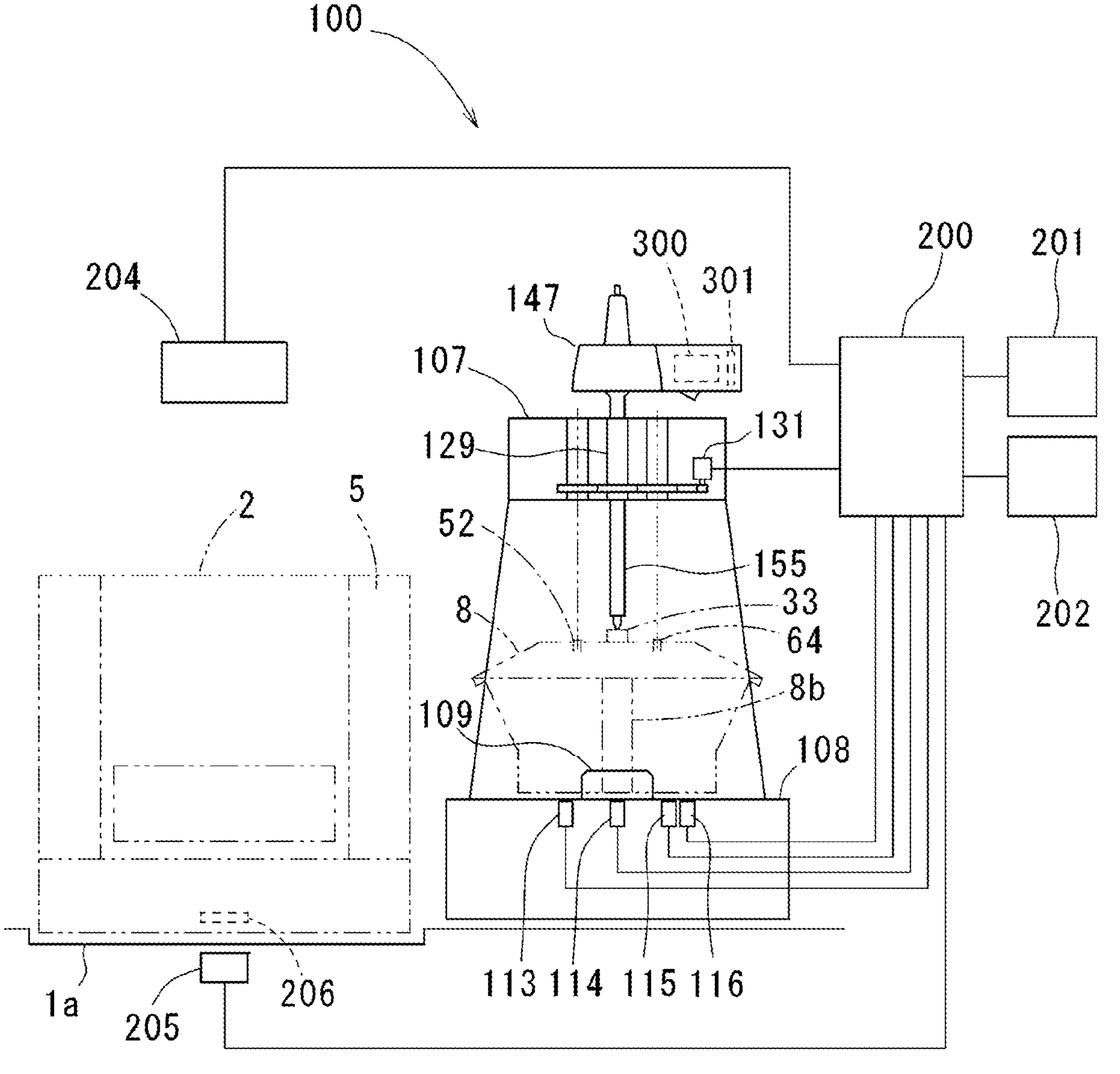
FIG. 38 is a system configuration diagram showing a modification of the tablet guide path adjusting device.

Further, in the above embodiment, the adjusting member 102 is configured to be manually turned, but as shown in FIG. 38, the adjusting member 102 may be provided with a motor 300 and a battery 301 that supplies power to the motor 300 and the driving force of the motor 300 may rotate the grip portion 147.

Further, in a state that the lid 6 of the tablet cassette 2 is opened and the rotor cover 30 is removed without removing the rotor 8 from the tablet cassette 2, at least one of the depth, height and width of the tablet guide path 8*b* of the rotor 8 in the tablet cassette 2 or the entry position of the partition member 20 may be adjusted by the adjustment member 102. In this case, when the grip part 147 is turned in the direction of the origin and it stops turning any more, the operation of step 33 in FIG. 33 may be performed by judging that each engaging portion 95*d*, 33*c*, 52*b* is positioned at the origin.

EXPLANATION OF REFERENCE NUMERALS

1: Tablet storing and dispensing device
2: Tablet cassette

5: Cassette body (tablet container)
8: Rotor
9: Tablet discharge hole
**8*b***: Tablet guide path
20: Partition member
24: Partition adjusting member
33: Depth adjusting member
52: Height adjusting member
64: Width adjusting member
100: Tablet guide path adjusting device
101: Device body
102: Adjusting member
105: Base portion
107: Guide portion
108: Rotor table
113: Height zero point detection switch
114: depth zero point detection switch
115: Width zero point detection switch
116: Width zero point detection switch
125: Upper guide hole
126: Lower guide hole
129: rotating member
131: Encoder (operation amount detection part)
132: Engaging hole
137: Elastic piece (rattling prevention part)
143: Lever (backlash prevention part)
144: Coil spring (backlash prevention part)
147: Grip portion
148: Shaft portion
153: First member
**153*e***: Lower engaging portion (torque limiter)
154: second member
**154*b***: Engagement portion (torque limiter)
155: Central shaft
156: Coil spring (torque limiter)
200: Control device
201: Display device (display part)
202: Tablet master (tablet master storage part)
M1: Partition adjusting mechanism
M2: Depth adjusting mechanism (tablet guide path adjusting mechanism)
M3: Height adjusting mechanism (tablet guide path adjusting mechanism)
M4: Width adjusting mechanism (tablet guide path adjusting mechanism)

What is claimed is:

1. A tablet guide path adjusting device for a tablet cassette including a tablet container storing a tablet and a rotor rotatably accommodated in the tablet container, the rotor having a tablet guide path for guiding the tablet of the tablet container to a tablet discharge hole of the tablet container and an adjusting part capable of adjusting dimensions of the tablet guide path, the tablet guide path adjusting device comprising:

an adjusting member that engages the adjusting part;

an operation amount detection part that detects an operation amount of the adjusting member; and a notification part that notifies a user of adjustment support information necessary for the user to adjust the adjusting part with the adjusting member based on the operation amount detected by the operation amount detection part.

2. The tablet guide path adjusting device as claimed in claim 1 further comprising a tablet master storage part that stores the dimensions of the tablet guide path suitable for a shape or a size of the tablet or numerical values related to the dimensions, wherein the notification part reads a target value of the dimensions of the tablet guide path corresponding to the tablet stored in the tablet container from the tablet master storage part and notify the target value and a current value of the adjusting part based on the operation amount of the operation amount detection part.

3. The tablet guide path adjusting device as claimed in claim 1, wherein the adjusting member is engageable with and disengageable from the rotor.

4. The tablet guide path adjusting device as claimed in claim 1, wherein the operation amount detection part is provided in a device body provided separately from the adjusting member.

5. The tablet guide path adjusting device as claimed in claim 1, wherein the adjusting part includes a plurality of adjusting parts, and wherein the adjusting member can be engaged and disengaged for each of the plurality of the adjusting parts of the rotor.

6. The tablet guide path adjusting device as claimed in claim 5, wherein the operation amount detection part includes a plurality of the operation amount detection parts provided corresponding to the plurality of the adjusting parts, and wherein the adjusting member can be engaged with and disengaged from the plurality of the operation amount detection parts.

7. The tablet guide path adjusting device as claimed in claim 1 further comprising a base part having a rotor table on which the rotor is mounted, wherein the base part is provided with a zero point detection sensor for detecting a zero point of the adjusting part.

8. The tablet guide path adjusting device as claimed in claim 7, wherein a guide part for guiding a central shaft of the adjusting member is provided above the base part, wherein a guide hole into which the central shaft of the adjusting member is inserted is formed in the guide part, and wherein the guide hole is formed on the same axis as the adjusting part of the rotor mounted on the rotor table.

9. The tablet guide path adjusting device as claimed in claim 8, wherein the operation amount detection part is provided in the guide part and detects a rotation amount of the central shaft of the adjusting member inserted through the guide hole.

10. The tablet guide path adjusting device as claimed in claim 9, wherein the guide part is provided with a rotating member capable of rotating integrally with the central shaft of the adjusting member, and wherein the operation amount detection part detects the rotation amount of the central shaft of the adjusting member inserted through the guide hole via the rotating member.

11. The tablet guide path adjusting device as claimed in claim 10, wherein the rotating member has an engaging hole that communicates with the guide hole and engages with the central shaft of the adjusting member.

12. The tablet guide path adjusting device as claimed in claim 11, wherein the rotating member is formed with a rattling prevention part that prevents rattling between the engaging hole and the central shaft.

13. The tablet guide path adjusting device as claimed in claim 9, wherein the rotating member and the operation amount detection part are connected via a gear and the operation amount detection part has a backlash prevention part that prevents backlash of the gear by biasing toward the rotating member.

14. The tablet guide path adjusting device as claimed in claim 1, wherein the adjusting member has a central shaft and a grip part, and wherein a torque limiter is provided between the central shaft and the grip part of the adjusting member to prevent transmission of a rotational force to the central shaft when the rotational force greater than a predetermined amount acts on the grip part.

15. The tablet guide path adjusting device as claimed in claim 14, wherein the grip part of the adjusting member is provided movably in the axial direction with respect to the central shaft and is movable between an engaging position where the grip part engages with the central shaft so as to be able to rotate integrally therewith and a non-engaging position where the grip part idles with respect to the central shaft.

* * * * *